(12) United States Patent
Yeh et al.

(10) Patent No.: US 12,496,362 B2
(45) Date of Patent: Dec. 16, 2025

(54) SILICONE-BASED ENTERIC CT CONTRAST MATERIAL

(71) Applicants: THE REGENTS OF THE UNIVERSITY OF CALIFORNIA, Oakland, CA (US); THE UNITED STATES GOVERNMENT as represented by THE DEPARTMENT OF VETERANS AFFAIRS, Washington, DC (US)

(72) Inventors: Benjamin M. Yeh, Hillsborough, CA (US); Yanjun Fu, San Francisco, CA (US)

(73) Assignees: The Regents of the University of California, Oakland, CA (US); The United States Government as represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 17/723,013

(22) Filed: Apr. 18, 2022

(65) Prior Publication Data
US 2022/0233725 A1    Jul. 28, 2022

Related U.S. Application Data

(60) Continuation of application No. 16/126,844, filed on Sep. 10, 2018, now abandoned, which is a division of application No. 14/912,258, filed as application No. PCT/US2014/051542 on Aug. 18, 2014, now abandoned.

(60) Provisional application No. 61/866,806, filed on Aug. 16, 2013.

(51) Int. Cl.
*A61K 49/04* (2006.01)
*A61B 6/00* (2006.01)

(52) U.S. Cl.
CPC .......... *A61K 49/0409* (2013.01); *A61B 6/481* (2013.01); *A61K 49/04* (2013.01); *A61B 6/482* (2013.01)

(58) Field of Classification Search
None
See application file for complete search history.

(56) References Cited

U.S. PATENT DOCUMENTS

| | | |
|---|---|---|
| 3,592,185 A | 7/1971 | Frei et al. |
| 4,615,879 A | 10/1986 | Runge et al. |
| 4,826,945 A | 5/1989 | Cohn et al. |
| 5,205,290 A | 4/1993 | Unger |
| 5,380,514 A * | 1/1995 | Waigh .................... A61K 49/12 600/420 |
| 5,472,682 A | 12/1995 | Ruddy et al. |
| 5,550,263 A | 8/1996 | Herslöf et al. |
| 5,580,579 A | 12/1996 | Ruddy et al. |
| 6,818,199 B1 | 11/2004 | Hainfeld et al. |
| 2007/0258907 A1 | 11/2007 | Davis |
| 2008/0233052 A1 | 9/2008 | Axelsson |

(Continued)

FOREIGN PATENT DOCUMENTS

| | | |
|---|---|---|
| EP | 1064953 A2 | 1/2001 |
| EP | 2127682 A1 | 12/2009 |

(Continued)

OTHER PUBLICATIONS

Sahani et al (Evaluation of Simethicone-Coated Cellulose as a Negative Oral Contrast Agent for Abdominal CT. Academic Radiology. Volume 10, Issue 5, May 2003, pp. 491-496) (Year: 2003).*
Johnson et al (Dual-energy CT for the Evaluation of Silicone Breast Implants. European Radiology vol. 23, pp. 991-996 (published online Oct. 2012) (Year: 2012).*
Fornaro et al (Dual- and multi-energy CT: approach to functional imaging. Insights Imaging. Apr. 2011; 2(2): 149-159) (Year: 2011).*
Matsuoka et al (Positive and Negative Oral Contrast Agents for Combined Abdominal and Pelvic Helical CT: First Iodinated Agent and Second Water. Radiat Med. May-Jun. 2000;18(3):213-6). (Year: 2000).*

(Continued)

*Primary Examiner* — Jake M Vu
(74) *Attorney, Agent, or Firm* — Morgan, Lewis & Bockius LLP; Jeffry S. Mann

(57) ABSTRACT

The present invention provides a silicon-based polymer contrast media for use in CT imaging. In an exemplary embodiment, the invention provides an enteric contrast medium formulation. An exemplary formulation comprises, (a) an enteric contrast medium comprising silicon-based polymer oil emulsified in water. Exemplary silicon-based polymer oil has a viscosity between about 50 cSt and 100,000 cSt. In various embodiments, the silicon-based polymer oil is emulsified with a vehicle or dispersing medium compatible with enteric administration of the formulation to a subject in need of such administration. In an exemplary embodiment, the contrast material is incorporated into a pharmaceutically acceptable vehicle in which the material is emulsified in the presence of a surfactant. In an exemplary embodiment, the silicon-based polymer comprises 30% or more of the weight of the contrast material formulation. The invention also provides methods for imaging of the abdomen by dual energy CT or spectral CT contemporaneously with the delivery of the silicon-based polymer contrast material into the bowel lumen and the delivery of a second complementary contrast material into the blood vessels or other body compartments. The invention also provides methods for the digital separation of CT signal produced by the contrast media of the invention from the CT signal produced by other contrast media or bodily tissues to generate multiple resultant CT images with the contrast medium of the invention subtracted or highlighted.

28 Claims, 15 Drawing Sheets

(56) References Cited

U.S. PATENT DOCUMENTS

| | | | |
|---|---|---|---|
| 2009/0297441 | A1 | 12/2009 | Canham et al. |
| 2009/0318550 | A1* | 12/2009 | Mallard ............... A61K 31/192 |
| | | | 514/533 |
| 2014/0276021 | A1 | 9/2014 | Yeh et al. |
| 2016/0193366 | A1 | 7/2016 | Yeh et al. |

FOREIGN PATENT DOCUMENTS

| | | |
|---|---|---|
| GB | 1174366 A | 12/1969 |
| JP | 63-255237 | 10/1988 |
| JP | H05-508387 T | 11/1993 |
| JP | H06-321865 A | 11/1994 |
| JP | H07-509716 T | 10/1995 |
| JP | H09-512029 T | 12/1997 |
| JP | H10-500691 T | 1/1998 |
| JP | 2000-504742 T | 4/2000 |
| JP | 2003-160512 | 6/2003 |
| JP | 2009-508924 A | 3/2009 |
| WO | WO 1991/014457 | 10/1991 |
| WO | WO 1992/017514 | 10/1992 |
| WO | WO 1994/003107 | 2/1994 |
| WO | WO 1995/032005 | 5/1995 |
| WO | WO 1995/022995 | 8/1995 |
| WO | WO 1995/028969 | 11/1995 |
| WO | WO 1997/030736 | 8/1997 |
| WO | WO 2007/034196 | 3/2007 |
| WO | WO 2012/080260 | 6/2012 |
| WO | WO 2012/080290 | 6/2012 |
| WO | WO 2012/101524 | 8/2012 |
| WO | WO 2012/170569 | 12/2012 |
| WO | WO 2013/184061 | 12/2013 |
| WO | WO 2014/145509 A1 | 9/2014 |
| WO | WO 2015/024025 A1 | 2/2015 |

OTHER PUBLICATIONS

Abuchowski, A. et al., "Effect of Covalent Attachment of Polyethylene Glycol on Immunogenicity and Circulating Life of Bovine Liver Catalase." *The Journal of Biological Chemistry*, vol. 252, Bi, 11, pp. 3582-3586 (1977).

Abuchowski, A. et al., "Cancer Therapy With Chemically Modified Enzymes. I. Antitumor Properties of Polyethylene Glycol-Asparaginase Conjugates." *Cancer Biochem. Biophys.*, vol. 7, pp. 175-186 (1984).

Beauchamp, C. et al., "A New Procedure for the Synthesis of Polyethylene Glycol-Protein Adducts; Effects on Function, Receptor Recognition, and Clearance of Superoxide Dismutase, Lactoferrin, and a2-Macroglobulin." *Analytical Biochemistry*, vol. 131, pp. 25-33 (1983).

Berger and Pizzo, "Preparation of Polyethylene Glycol-Tissue Plasminogen Activator Adducts That Retain Functional Activity: Characteristics and Behavior in Three Animal Species." *Blood*, vol. 71, No. 6, pp. 1641-1647 (1988).

Boccu, E. et al., "Coupling of Monomethoxypolyethyleneglycols to Proteins via Active Esters." *Z. Naturforsch.*, vol. 38c, pp. 94-99 (1983).

Bückmann and Morr, "Functinoalization of Poly(ethylene glycol) and Monomethoxy-Poly(ethylene glycol)." *Makromol. Chem.*, vol. 182, pp. 1379-1384 (1981).

Byun, Y. et al., "Binding Kinetics of Thrombin and Antithrombin III with Immobilized Heparin Using a Spacer." *ASAIO Journal*, M649-M653 (1992).

Cohn and Younes, "Biodegadable PEO/PLA block copolymers." *Journal of Biomedical Materials Research*, vol. 22, pp. 993-1009 (1988).

Delgado, C. et al., "Coupling of Poly(ethylene glycol) to Albumin under Very Mild Conditions by Activation with Tresyl Chloride: Characterization of the Conjugate by Partitioning in Aqueous Two-Phase Systems." *Biotechnology and Applied Biochemistry*, vol. 12, pp. 119-128 (1990).

Dekrafft et al., "Zr and Hf-based nanoscale metal-organic frameworks as contrast agents for computed tomography." J. Mater Chem., 22(35): 18139-44 (2012).

Gamarra et al., "Characterization of Superparamagnetic Iron Oxide Coated with Silicone Used as Contrast Agent for Magnetic Resonance Image for the Gastrointestinal Tract." Journal of Nanoscience and Nanotechnology, vol. 10, pp. 1153-1158 (2010).

Jackson, C.C. et al., "Synthesis, Isolation, and Characterization of Conjugates of Ovalbumin with Monomethoxypolyethylene Glycol Using Cyanuric Chloride as the Coupling Agent." Analytical Biochemistry, vol. 165, pp. 114-127 (1987).

Johnson et al., "Dual-energy CT for the evaluation of silicone breast implants." *Eur Radiol* 23:991-996 (2012).

Joppich and Luisi, "Peptides Flanked by Two Polymer Chains, 1 Synthesis of Glycyl-L-tryptophylglycine Substituted by Poly(ethylene oxide) at both the Carboxy and the Amino End Groups." *Makromol. Chem.*, vol. 180, pp. 1381-1384 (1979).

Katre, N.V. et al., "Chemical modification of recombinant interleukin 2 by polyethylene glycol increases its potency in the murine Meth A sarcoma model." *Proc. Natl. Acad. Sci. USA*, vol. 84, pp. 1487-1491 (1987).

Kitamura, K. et al., "Chemical Engineering of Monoclonal Antibody A7 by Polyethylene Glycol for Targeting Cancer Chemotherapy." *Cancer Research*, vol. 51, pp. 4310-4315 (1991).

Koide and Kobayashi, "Modification of Amino Acids in Porcine Pancreatic Elatase With Polyethylene Glycol in Relation to Binding Ability Towards Anti-Serum and to Enzymic Activity." *Biochemical and Biophysical Research Communications*, vol. 111, No. 2, pp. 659-667 (1983).

Laurent et al., Magnetic Iron Oxide Nanoparticles: Synthesis, Stabilization, Vectorization, Physicochemical Characterizations, and Biological Applications. Chem. Rev. 108, 2064-2110 (2008).

Mongan, John et al., "In Vivo Differentiation of Complementary Contrast Media at Dual- Energy CT." *Radiology*, vol. 265, No. 1, pp. 267-272 (2012).

Murty, R.C., "Effective atomic Nos. of heterogeneous materials." *Nature*, vol. 207, pp. 398-399 (1965).

Nilsson and Mosbach, "Immobilization of Ligands with Organic Sulfonyl Chlorides." *Methods in Enzymology*, vol. 104, pp. 56-69 (1984).

Primak et al., "Improved dual-energy material discrimination for dual-source CT by means of additional spectral filtration." Am. Assoc. Phys. Med., vol. 36, No. 4, pp. 1359-1369 (2009).

Sahani et al., "Evaluation of Simethicone-coated Cellulose as a Negative Oral Contrast Agent for Abdominal CT." *Acad Radiol* 10:491-496 (2003).

Van Schooneveld et al., "A fluorescent, paramagnetic and PEGylated gold/silica nanoparticle for Mri, Ct and fluorescence imaging." *Contrast Media Mol Imaging*. 5(4): 231-236 (2010).

Veronese, F.M. et al., "Surface Modification of Proteins. Activation of monomethoxy-Polyethylene Glycols by Phenylchloroformates and Modification of Riobuclease and Superoxide Dismutase." *Applied Biochemistry and Biotechnology*, vol. 11, pp. 141-152 (1985).

Woghiren, C. et al., "Protected Thiol-Polyethylene Glycol: A New Activated Polymer for Reversible Protein Modification." *Bioconjugate Chem.*, vol. 4, pp. 314-318 (1993).

Younes and Cohn, "Morphological study of biodegradable PEO/PLA block copolymers." Journal of Biomedical Materials Research, vol. 21, pp. 1301-1316 (1987).

Yu and Watson, "Metal-Based X-ray Contrast Media." *Chem. Rev.*, vol. 99, pp. 2353-2377 (1999).

Zalipsky and Lee, "Use of Functionalized Poly(Ethylene Glycol)s for Modification of Polypeptides." *Poly(ethylene glycol) Chemistry: Biotechnical and Biomedical Applications*, Harris Ed., Plenum Press, NY, pp. 347-370 (1992).

Zalipsky, S. et al., "Evaluation of a New Reagent for Covalent Attachment of Polyethylene Glycol to Proteins." *Biotechnology and Applied Biochemistry*, vol. 15, pp. 100-114 (1992).

Piao et al., "Designed Fabrication of Silica-Based Nanostructure Particle Systems for Nanomedicine Applications." Adv. Func. Mater., 18, 3745-3758 (2008).

Nakamura et al., "Thiol-Organosilica Particles Internally Functionalized with Popidium Iodide as a Multicolor Fluorescence and X-ray

(56) References Cited

OTHER PUBLICATIONS

Computed Tomography Probe and Application for Non-Invasive Functional Gastrointestinal Tract Imaging." Chem. Materials., ACS Publications., 24, 3772-3729 (2012).

Fitzgerald et al., "CT Image Contrast of High-Z Elements: Phantom Imaging Studies and Clinical Implications." Radiology, vol. 278, No. 3, pp. 723-733 (2016).

Fornaro et al., "Dual- and multi-energy CT: approach to functional imaging." Insights Imaging. 149-159 (2011).

Matsuoka et al., "Positive and Negative Oral Contrast Agents for Combined Abdominal and Pelvic Helical CT: First Iodinated Agent and Second Water." Radiat Med. 18(3):213-6). (2000).

\* cited by examiner

FIG. 7

| Substance | 80 kVp (HU) | 100 kVp (HU) | 140 kVp (HU) | 80:140 kVp HU ratio | 100:140 kVp HU ratio |
|---|---|---|---|---|---|
| 75% Silicon oil (FS, 50 cSt): 5.0g H2O 0.05 g Tween20 (totally a 20-g mixture) | 159.8 | 104.1 | 57.70 | 2.77 | 1.80 |
| 75% Silicon Oil (FS, 50 cSt): 5g H2O 0.05 g Triton X-100, | 154.0 | 99.49 | 56.10 | 2.75 | 1.77 |
| 90% Silicon Oil (FS, 50 cSt): 2g H2O 0.05 g Tween20 | 181.4 | 118.2 | 65.52 | 2.77 | 1.80 |
| 75% Silicon Oil (FS, 50 cSt): 5g water (1% soap) | 152.4 | 99.23 | 55.64 | 2.74 | 1.78 |
| Colloid $SiO_2$ 50% (Ludox commercial product) | 572.4 | 509.9 | 452.2 | 1.27 | 1.13 |
| 50% Crystal $SiO_2$ (1-5μm) in H2O, no additives, | 635.5 | 566.2 | 501.6 | 1.22 | 1.13 |
| 60% crystal $SiO_2$ (1-5μm) in H2O, no additives, | 834.7 | 744.3 | 662.9 | 1.21 | 1.12 |
| Silicone Oil 100% 50 cSt (Fisher Scientific) | 212 | 148 | 82 | 2.58 | 1.80 |
| Silicone Oil 100% 10000 cSt (Fisher Scientific) | 187.3 | | 68.7 | 2.72 | |
| Fluorosilicone Oil 100% | 385 | 335 | 279 | 1.38 | 1.20 |
| Silicone rubber moulding material (TAP Plastics) | 643.7 | | 415.7 | 1.55 | |
| Silicone rubber moulding material (Smoothon) | 425.3 | | 284.0 | 1.50 | |
| Silicone oil 100% Sigma Aldrich (SA) 50 cSt | 203 | 139.1 | 78.1 | 2.60 | 1.78 |
| Silicone oil 100% Sigma Aldrich 350 cSt | 209 | 144.7 | 84.2 | 2.48 | 1.72 |
| Silicone oil 100% Sigma Aldrich 1000 cSt | 207 | 147.4 | 86.8 | 2.40 | 1.70 |
| Silicone oil 75% emulsion from SA 50 cSt oil | 164 | 113 | 61.2 | 2.67 | 1.84 |
| Silicone oil 75% emulsion from SA 350 cSt oil | 167 | 117.7 | 66.6 | 2.52 | 1.77 |
| Silicone oil 75% emulsion from SA 1000 cSt oil | 166 | 116.1 | 63.8 | 2.61 | 1.81 |
| | | | | | |
| Iohexol 5 mg iodine/mL | 231.1 | 186.9 | 136.1 | 1.70 | 1.37 |
| BaSO4 20mg/mL | 532.6 | 439.7 | 319.8 | 1.67 | 1.37 |
| Canola olive oil 100% | -139.6 | | -109.3 | 1.28 | |
| Paraffin | -147 | -130 | -106 | 1.39 | 1.22 |
| Isopropyl alcohol 70% | -147.3 | -147.5 | -136.4 | 1.08 | 1.08 |

FIG. 8

|  | CT number at virtual monochromatic 40 keV reconstruction (HU) | CT number at virtual monochromatic 140 keV reconstruction (HU) |
|---|---|---|
| Gadolinium | 241.6 | 77.6 |
| Iohexol | 348.6 | -0.5 |
| Silica | 654.9 | 208.3 |
| Silicone oil | 485.0 | -84.4 |
| Silicone oil emulsion | 351.7 | -68.8 |
| Human fat | -175 | -77 |
| Olive canola oil 100% | -268.8 | -79.3 |

FIG. 10

| Trade name | Synonym | HLB |
|---|---|---|
|  | 2,4,7,9-Tetramethyl-5-decyne-4,7-diol | 4.0 |
|  | PEG-block-PPG-block-PEG, MN 1100 | 4.0 |
|  | PEG-block-PPG-block-PEG, MN 2000 | 4.0 |
|  | PEG-block-PPG-block-PEG, MN 2800 | 4.0 |
|  | PEG-block-PPG-block-PEG, MN 4400 | 4.0 |
|  | Ethylenediamine tetrakis(PO-b-EO) tetrol, MN 3600 | 4.0 |
|  | Ethylenediamine tetrakis(EO-b-PO) tetrol, MN 7200 | 4.0 |
|  | Ethylenediamine tetrakis(EO-b-PO) tetrol, MN 8000 | 4.0 |
| Igepal® CA-210 | Polyoxyethylene(2) isooctylphenyl ether | 4.3 |
| Span® 80 | Sorbitan monooleate | 4.3 |
|  | PPG-block-PEG-block-PPG, MN 3300 | 4.5 |
| Igepal CO-210 | Polyoxyethylene(2) nonylphenyl ether | 4.6 |
| Span® 60 | Sorbitan monostearate | 4.7 |
| Brij® 92 | Polyoxyethylene(2) oleyl ether | 4.9 |
| Brij® 72 | Polyoxyethylene(2) stearyl ether | 4.9 |
| Brij® 52 | Polyoxyethylene(2) cetyl ether | 5.3 |
| Span® 40 | Sorbitan monopalmitate | 6.7 |
| Merpol® A surfactant |  | 6.7 |
|  | 2,4,7,9-Tetramethyl-5-decyne-4,7-diol ethoxylate | 8.0 |
| Triton® SP-135 |  | 8.0 |
| Span® 20 | Sorbitan monolaurate | 8.6 |
|  | PEG-block-PPG-block-PEG, MN 5800 | 9.5 |
|  | PPG-block-PEG-block-PPG, MN 2700 | 9.5 |
| Brij® 30 | Polyoxyethylene(4) lauryl ether | 9.7 |
| Igepal® CA-520 | Polyoxyethylene(5) isooctylphenyl ether | 10.0 |
| Igepal® CO-520 | Polyoxyethylene(5) nonylphenyl ether | 10.0 |
|  | Polyoxyethylene sorbitol hexaoleate | 10.2 |
| Merpol® SE surfactant |  | 10.5 |
| Tween® 85 | Polyoxyethylene(20) sorbitan trioleate | 11.0 |
|  | 8-Methyl-1-nonanol propoxylate-block-ethoxylate | 11.0 |
|  | Polyoxyethylene sorbitan tetraoleate | 11.4 |
| Triton® X-114 | Polyoxyethylene(8) isooctylphenyl ether | 12.4 |
| Brij® 76 | Polyoxyethylene(10) stearyl ether | 12.4 |
| Brij® 97 | Polyoxyethylene(10) oleyl ether | 12.4 |
| Merpol® OJ surfactant |  | 12.5 |
| Brij® 56 | Polyoxyethylene(10) cetyl ether | 12.9 |
| Merpol® SH surfactant |  | 12.9 |
| Tergitol® NP-9 | Nonylphenol polyethylene glycol ether | 12.9 |
|  | 2,4,7,9-Tetramethyl-5-decyne-4,7-diol ethoxylate (5 EO/OH) | 13.0 |
| Triton® SP-190 |  | 13.0 |
| Igepal® CO-630 | Polyoxyethylene(9) nonylphenyl ether | 13.0 |
| Triton® X-100 | Polyoxyethylene(10) isooctylphenyl ether | 13.5 |
| Igepal® CO-720 | Polyoxyethylene(12) nonylphenyl ether | 14.2 |
|  | Polyoxyethylene(12) tridecyl ether | 14.5 |
|  | Polyoxyethylene(18) tridecyl ether | 14.5 |
| Igepal® CA-720 | Polyoxyethylene(12) isooctylphenyl ether | 14.6 |
| Tween® 80 | Polyoxyethylene(20) sorbitan monooleate | 14.9 |
| Tween® 60 | Polyoxyethylene(20) sorbitan monostearate | 15.0 |
|  | PEG-block-PPG-block-PEG, MN 2900 | 15.0 |
|  | PPG-block-PEG-block-PPG, MN 2000 | 15.0 |
| Brij® 78 | Polyoxyethylene(20) stearyl ether | 15.3 |
| Brij® 98 | Polyoxyethylene(20) oleyl ether | 15.3 |
| Merpol® HCS surfactant |  | 15.5 |
| Tween® 40 | Polyoxyethylene(20) sorbitan monopalmitate | 15.6 |
| Brij® 58 | Polyoxyethylene(20) cetyl ether | 15.7 |
|  | Polyethylene-block-poly(ethylene glycol)Mn 2250 | 16.0 |
| Tween® 20 | Polyoxyethylene(20) sorbitan monolaurate | 16.7 |
| Brij® 35 | Polyoxyethylene(23) lauryl ether | 16.9 |
|  | 2,4,7,9-Tetramethyl-5-decyne-4,7-diol ethoxylate (15 EO/OH) | 17.0 |
| Igepal® CO-890 | Polyoxyethylene(40) nonylphenyl ether | 17.8 |
| Triton® X-405 | Polyoxyethylene(40) isooctylphenyl ether | 17.9 |
| Brij® 700 | Polyoxyethylene(100) stearyl ether | 18.8 |
| Igepal® CO-990 | Polyoxyethylene(100) nonylphenyl ether | 19.0 |
| Igepal® DM-970 | Polyoxyethylene(150) dinonylphenyl ether | 19.0 |
|  | PEG-block-PPG-block-PEG, MN 1900 | 20.5 |
| Pluronic F68 | PEG-block-PPG-block-PEG, MN 8400 | 24.0 |
|  | Ethylenediamine tetrakis(PO-b-EO) tetrol, MN 15000 | 24.0 |
|  | PEG-block-PPG-block-PEG, average Mn ca. 14,600 | 27.0 |

Fig. 13

| Material | Manufacturer | CT number | | | | 80:140 kVp CT number ratio |
|---|---|---|---|---|---|---|
| | | 80 kVp | 100 kVp | 120 kVp | 140 kVp | |
| Iohexol 8.75 mg I/mL | GE | 376 | 300 | 249 | 212 | 1.77 |
| | Siemens | 364 | 279 | 230 | 198 | 1.84 |
| Readicat | GE | 572 | 459 | 382 | 328 | 1.74 |
| | Siemens | 570 | 451 | 376 | 326 | 1.75 |
| Silicone oil 350 cst | GE | 216 | 150 | 110 | 82 | 2.63 |
| | Siemens | 212 | 143 | 106 | 81 | 2.62 |
| ~70% silicone oil emulsion | GE | 150 | 102 | 73 | 53 | 2.83 |
| | Siemens | 162 | 114 | 81 | 60 | 2.70 |

Fig. 14

| Substance | 80 kVp (HU) | 100 kVp (HU) | 140 kVp (HU) | 80:140 kVp HU ratio | 100:140 kVp HU ratio |
|---|---|---|---|---|---|
| Silicone oil 75% emulsion from Fisher Scientific 50 cSt oil | 159.8 | 104.1 | 57.70 | 2.77 | 1.80 |
| Colloid SiO$_2$ 50% (Ludox commercial product) | 572.4 | 509.9 | 452.2 | 1.27 | 1.13 |
| 50% Crystal SiO$_2$ (1-5μm) in H2O, no additives, | 635.5 | 566.2 | 501.6 | 1.22 | 1.13 |
| 60% crystal SiO$_2$ (1-5μm) in H2O, no additives, | 834.7 | 744.3 | 662.9 | 1.21 | 1.12 |
| Silicone Oil 100% 50 cSt (Fisher Scientific) | 212 | 148 | 82 | 2.58 | 1.80 |
| Silicone Oil 100% 10000 cSt (Fisher Scientific) | 187.3 | | 68.7 | 2.72 | |
| Fluorosilicone Oil 100% | 385 | 335 | 279 | 1.38 | 1.20 |
| Silicone rubber moulding material (TAP Plastics) | 643.7 | | 415.7 | 1.55 | |
| Silicone rubber moulding material (Smoothon) | 425.3 | | 284.0 | 1.50 | |
| Silicone oil 100% Sigma Aldrich (SA) 50 cSt | 203 | 139.1 | 78.1 | 2.60 | 1.78 |
| Silicone oil 100% Sigma Aldrich 350 cSt | 209 | 144.7 | 84.2 | 2.48 | 1.72 |
| Silicone oil 100% Sigma Aldrich 1000 cSt | 207 | 147.4 | 86.8 | 2.40 | 1.70 |
| Silicone oil 75% emulsion from SA 50 cSt oil | 164 | 113 | 61.2 | 2.67 | 1.84 |
| Silicone oil 75% emulsion from SA 350 cSt oil | 167 | 117.7 | 66.6 | 2.52 | 1.77 |
| Silicone oil 75% emulsion from SA 1000 cSt oil | 166 | 116.1 | 63.8 | 2.61 | 1.81 |

SILICONE-BASED ENTERIC CT CONTRAST MATERIAL

CROSS-REFERENCE TO RELATED APPLICATIONS

This application is a Continuation of U.S. patent application Ser. No. 16/126,844 filed Sep. 10, 2018, which is a Divisional of U.S. patent application Ser. No. 14/912,258 filed Feb. 16, 2016 which is a 371 of PCT/US2014/051542 filed Aug. 18, 2014, which claims, under 35 USC 119(e), the benefit of U.S. Provisional Application No. 61/866,806 filed Aug. 16, 2013, all of which are incorporated herein by reference in their entireties for all purposes.

BACKGROUND OF THE INVENTION

Computed tomography (CT) currently outperforms all other diagnostic tests for the evaluation of many common clinical scenarios, including urgent trauma triage, the evaluation of abdominal pain, and the evaluation for inflammatory or ischemic bowel. The development of contrast material for CT imaging revolutionized medical imaging, particularly in the abdomen and pelvis where visceral organs show intertwined anatomy. Despite the proven value of contrast materials for CT, no substantially improved clinical agent has been introduced in the past 20 years. All commercial CT contrast materials are based on iodine (intravascular or enteric) or barium (enteric only).

A fundamental limitation of current clinical CT contrast materials is their inability to be distinguished from each other or from other radiodense structures such as shrapnel, calcifications, surgical staple lines or implants. Even with Dual Energy CT (DECT) or multi-energy CT, now an increasingly widespread clinical technology that allows material decomposition of imaged voxels based on known 80:140 kVp CT number ratios of individual substances, iodine and barium-based contrast materials cannot be readily differentiated from each other because their 80:140 kVp CT number ratios are virtually identical. This limitation causes clinical confusion and delays. For example, a CT scan enhanced with oral barium and intravenous iodine contrast that shows contrast leakage into the peritoneum may be ambiguous for whether the leak is due to bleeding (iodine), bowel perforation (barium), or urinary tract injury (excreted iodine), each of which is a clinical emergency but requires dramatically different management. Such ambiguity leads to confusion, delay, and medical errors. To resolve ambiguity, scans may be repeated at the expense of lost time and reduced therapeutic opportunity. Repeat CT scans also result in additional radiation dose. Increased public concern about CT radiation dose resulted in a 2011 NIH summit focused on CT dose reduction. CT scanners capable of multi-energy or spectral imaging are under development, but even with improved capability, these new CT technologies are unlikely to be able to readily differentiate iodinated from barium-based conventional contrast material.

The high value of "positive" enteric CT contrast, which marks bowel lumen with bright signal at CT imaging, is undisputed for the detection of extra-enteric fluid collections, bowel perforations, and masses in a wide range of disease. Tumors, abscesses, and hematomas that resemble bowel are well known diagnostic pitfalls in CT interpretation. Despite the value of "positive" enteric contrast, bright enteric contrast material paradoxically obscures intravenous contrast CT findings for some of the most devastating of diseases, including 1) Trauma where contrast material leakage may be ambiguous for being from vascular bleeding versus bowel lumen origin; 2) Bowel ischemia and infarction where bowel wall non-enhancement may be obscured by bright intralumenal enteric contrast material; 3) Bowel inflammation where bowel wall hyper-enhancement by IV contrast is the most reliable feature of active disease; 4) Enteric bleeding where iodinated contrast extravasation into bowel or enhancing tumors is masked by the presence of enteric contrast; and 5) CT angiograms where enteric contrast limits three-dimensional reformations.

Further limitations of current enteric CT contrast material are toxicity and complications. Barium-based agents may cause severe, potentially fatal peritonitis or aggravate infections at sites of leak, and may convert a partial bowel obstruction into a complete bowel obstruction. Iodinated agents may cause severe, even fatal pneumonitis when inadvertently aspirated and may also cause life threatening allergic-type reactions, and this concern limits its use in the up to 1% of patients with known prior reactions. This is may be related in part to the hyperosmolality of some clinical CT agents. Moreover, several of these agents are brownish in color and poor-tasting. Some patients (up to 1-3%) have reactions to iodinated contrast material.

"Neutral" enteric CT contrast material, such as water or a fluid with non-absorbable carbohydrates including sorbitol or methylcellulose without iodine or barium, resemble water or soft tissue in a CT signal and have CT numbers between −10 and 60 Hounsfield units in CT imaging. These agents are commonly used to expand the lumen of the bowel and allow intravenous contrast material to vividly show the relative hyper or hypo vascularity of the bowel wall which might otherwise be obscured by "positive" enteric contrast material. Since the signals from these agents resemble natural soft tissue or water signals, they may not allow as confident of a diagnosis as "positive" enteric contrast agents for bowel leak, extralumenal fluid collections, intraabdominal abscess, or hematoma.

"Negative" enteric contrast agents are not commonly used but have a CT number value less than −20 Hounsfield Units. Hydrocarbon oils, such as peanut oil or vegetable oil have been used to provide "negative" enteric contrast materials, which can provide excellent delineation of the bowel wall and bowel wall enhancement when given with intravenous contrast agents, however, "negative" agents are not well tolerated. Furthermore, "negative" and "neutral" contrast materials are not as useful as positive enteric contrast materials to delineate bowel leakage or extralumenal fluid collection, abscesses, or hematomas because "negative" and "neutral" agents resemble naturally-occurring fluid or fat, respectively and so fluid collection outside of the bowel or blood vessels are ambiguous regarding whether the signal represents contrast material versus fluid or fat.

Dual energy CT and spectral CT allow simultaneous or near simultaneous imaging of a subject with two different energy X-ray spectra, one with a higher overall energy and one with a lower overall energy. Individual materials show unique ratios of X-ray attenuation at low versus high energy X-ray spectra, and so differences in the low versus high X-ray energy spectra attenuation can be used to distinguish between individual materials at CT imaging. X-ray spectra are typically determined by the X-ray tube potential setting. For example, setting the tube potential at 80 kVp will generate a low energy X-ray spectrum and 140 kVp will generate a high energy X-ray spectrum. The 80:140 kVp CT number ratio is fixed for any individual material, regardless of the concentration of the material. Therefore, imaging two materials at dual energy CT where the X-ray tube potentials are set at 80 and 140 kVp, allows for differentiation of the two materials based on their known characteristic 80:140 kVp CT number ratios. The material decomposition may be performed on the CT projection data obtained by the detectors prior to reconstruction of the CT images, or may be obtained from the reconstructed CT images.

Modern dual energy and spectral CT images can also be reconstructed as virtual monochromatic images, which are images that simulate what a CT scan image would look like if it had been obtained with monochromatic X-rays at any given X-ray energy, such as an energy selected from 40 to 140 keV. In these virtual monochromatic images, iodinated and barium contrast material are seen to be highly "positive" at low keV settings (40 to 70 keV), and gradually decrease in signal such that at high keV settings (140 keV), the signal of the iodinated and barium contrast material diminishes to the regular baseline of water or soft tissue (approximately −10 to 50 Hounsfield Units). In other words, barium and iodine can serve as "positive" contrast at low keV, and "neutral" contrast at high keV. However, iodinated and barium agents still cannot be differentiated from each other.

No existing or previously-reported enteric CT contrast material can serve simultaneously as "positive", "neutral", and "negative" contrast.

Several clinical scenarios commonly occur in which CT diagnosis would be improved through the use of an enteric "positive" contrast medium that could also be converted by image post-processing to be "negative" contrast medium. For example, in suspected bowel ischemia, "neutral" or "negative" enteric contrast would be helpful to find either hyperenhancement or hypoenhancement of the bowel wall to detect inflammation or ischemia, respectively. In this same scenario "positive" contrast would allow identification of bowel perforation, abscesses, and fistulas. Without an enteric agent that can be both "positive" and "negative", the imaging physician must choose between multiple agents knowing that certain findings may be highlighted but other critical findings may be obscured by any available CT protocol, and hence the CT scan is suboptimal.

Development of a safe clinical enteric contrast material that can be used simultaneously with, but be differentiated from, iodinated and barium agents or other agents in development such as those based on heavy metals such as tungsten or tantalum would immediately dramatically transform dual energy CT imaging of trauma patients and millions of Americans for a wide spectrum of diseases. Multiple bodily compartments could be injected and interrogated simultaneously for a dual energy, spectral, or multi-energy CT examination to provide timely high resolution perfectly co-registered anatomic images of each system for rapid and confident diagnosis and will transform clinicians' ability to urgently and accurately evaluate multi-organ injury from trauma, invasive tumors, surgical complications, and inflammatory disease.

Development of a safe clinical enteric CT contrast material that can be digitally manipulated to appear as a "positive," "neutral", or "negative" contrast material under the control of the interpreting physician would provide powerful diagnostic capabilities and remove guesswork and protocol errors as well as diagnostic errors. Reduced errors will result in faster diagnoses and a reduced need for additional workup. Physicians would no longer need to weigh the benefits and drawbacks of giving "neutral" or "negative" versus "positive" enteric contrast material for given clinical scenarios.

Non-iodinated materials tested for use with CT imaging include a broad range of high atomic-number (Z) elements: tungsten, tantalum, bismuth, gold, the lanthanides such as gadolinium, ytterbium among others [Yu S, Watson A. Metal-Based X-ray Contrast Media. Chem Rev. 1999; 99(9): 2353-2378; and Mongan J, Rathnayake S, Fu Y, Wang R, Jones E F, Gao D W, Yeh B M. In vivo Differentiation of Complementary Contrast Media at Dual-Energy CT. Radiology. 2012; 265(1): 267-272]. High Z elements attenuate X-rays more per mole than do low Z elements. Materials based on the low-atomic-number elements with atomic numbers less than 30 have not yet received attention or research interest for CT or DECT contrast enhancement applications.

With respect to image quality and utility, iodinated enteric contrast material cannot be readily differentiated from intravascular iodinated agents by DECT, except by context. Barium enteric contrast material cannot be readily differentiated either from intravascular iodinated agents by DECT, except by context. Extravasation of barium from the bowel into surrounding tissue acts as an adjuvant and substantially exacerbates infections and abscesses. Extravasated barium may worsen inflammation and cause tissue granulation. Barium may flocculate (coat the bowel wall), often in a coarse heterogeneous pattern, and thereby cause imaging artifacts or confusing appearances of the bowel. Intravasated barium (barium that leaks out of damaged bowel and into the bloodstream) may cause micro emboli to the lung or liver and have prolonged retention. Barium suspensions separate readily and often need to be shaken right before ingestion. Barium agents leave a chalky white residue in and around the mouth and on clothes.

An oral/enteric contrast agent that does not interfere with intravenous contrast agents for CT imaging of bowel wall enhancement/non-enhancement would cause a frame shift in the approach to CT imaging of the abdomen, and allow DECT to dramatically improve abdominal imaging. Dual energy CT is a relatively new technology, with practical DECT scanners only available for the past 5 years. Currently, most radiologists give enteric contrast for routine abdominopelvic CT scans to distinguish bowel from other intraperitoneal structures (such as free fluid, loculated collections, ovaries, tumors). However, positive enteric contrast obscures the bowel wall vascular enhancement/nonenhancement, and thereby reduces the effectiveness of CT for the evaluation of bowel inflammation, tumor, ischemia, and other pathology. Also, extravasated contrast material may be ambiguous as to whether it came from bowel, a blood vessel, or both. Currently, no feasible contrast material complementary to iodine- or barium based contrast materials are available.

BRIEF SUMMARY OF THE INVENTION

The present invention solves these and other existing problems by providing safe and effective formulations containing silicone-polymer based compounds as enteric CT (or DECT) contrast materials suitable for human use. In an exemplary embodiment, the silicone polymer is an oil (or other water-immiscible liquid) and the formulation is an oil-in-water type emulsion. In various embodiments, the present invention provides the benefits of both "positive" and "negative" enteric contrast with CT without the pitfalls of either type of enteric contrast medium. Benefits of "positive" enteric contrast include: superior identification of enteric leaks, detection of extralumenal collections such as abscesses, detection of abdominopelvic tumors and masses, evaluation of intestinal transit time, identification of bowel obstruction transition points, superior evaluation for bowel wall thickening. Pitfalls of "positive" enteric contrast include: toxicity of iodinated or barium contrast material (see below), or when concurrent intravascular contrast material is given, obscuration of critically important findings for bowel mural ischemia or bowel inflammation, obscuration of abdomenopelvic vasculature, prevention of 3D reformation for CT angiography, ambiguity as to the origin of extravasated contrast material, and obscuration of active intraluminal gastrointestinal bleeding. Benefits of "negative" and "neutral" enteric contrast materials include: superior evaluation of bowel mural hyper- or hypoenhancement; superior evaluation of enhancing intraluminal masses; non-interference with three dimensional reformations of CT angiograms; and lower radiation dose when CT scans are obtained with automatic exposure control owing to the lower X-ray attenuation of the "negative" agent on the CT scout image. Pitfalls of "negative" enteric contrast include reduced ability to detect bowel leakage or extraluminal fluid collections, abscesses, or hematomas.

Use of a low atomic number atom containing agent has many benefits over use of higher atomic number atom containing agents: 1) unit cost is much lower; 2) toxicity is much lower; 3) many low atomic number atom containing agents are already used in food or over the counter medications. Low atomic number atom containing agents could replace high atomic number agents for routine CT.

Enteric agents for CT are generally safer than injectable ones for several reasons: 1) Substantially lower doses and concentrations of enteric contrast are needed than intravascular agents. Typical intravenous iodinated agent administration requires up to 150 mL of 350 mg iodine/mL contrast (52 gram iodine dose) for an abdominal CT scan. The typical oral dose is 800 mL of only 10 mg iodine/mL contrast (8 gram total iodine dose); 2) Very little contrast material is absorbed through the bowel wall into the vasculature; 3) Viscosity and osmolality are of minimal concern for enteric contrast materials; 4) Renal toxicity, which is seen with all intravascular agents, is unlikely with enteric agents; 5) Anaphylactoid and immune reactions are far less likely to occur with enteric than intravascular contrast administration.

Moreover, the non-iodinated, non-barium enteric agent of the invention, when used for clinical CT, offers the advantage of allowing simultaneous administration of the enteric contrast material and a separate intravascular or other bodily compartment contrast material that can be readily differentiated from each other by dual energy or spectral CT. Because the agents are administered such that they are imaged when they are simultaneously present in the body, in one embodiment, essentially perfect co-registration of images of contrast enhanced regions is provided and the information available for evaluation is greater and more accurate than if each contrast material were delivered and imaged separately and separate CT scans performed. Furthermore, in an exemplary embodiment, the radiation dose is about half of what two separate scans would deliver. In various embodiments, the contrast medium and formulations of the invention facilitate repeat CT scanning, reducing the ambiguity caused by previously delivered different-material based oral contrast.

The formulations and method of the invention also provide the advantage of reducing radiation dose due to reduced need for repeat/follow-up scans.

In an exemplary embodiment, the invention provides an agent that can be better separated at dual energy CT from both iodinated or barium contrast material and from soft tissue or water than any other previously described contrast material due to the very high 80:140 kVp CT number ratio of over 2.5.

In an exemplary embodiment, the invention provides a contrast material that can be better separated at dual energy CT from heavy-metal-based contrast material than any other previously described contrast material due to the very high 80:140 kVp CT number ratio of the invention (over 2.5). Heavy-metal-based contrast materials include W-, Ta-, Yb-, Bi-, and Au-based agents that are in development, and which generally have an 80:140 kVp CT number ratio of less than 1.3.

In an exemplary embodiment, the invention provides an oil-in-water emulsion, which is an enteric contrast medium formulation. An exemplary formulation comprises an enteric contrast medium comprising essentially water-insoluble oil droplets and/or solid particles of a material made of a plurality of atoms with atomic numbers within the range of 6 to 52, inclusive. The material, in an exemplary embodiment, is emulsified in a pharmaceutically acceptable vehicle in which the droplets and/or particles are homogeneously suspended with the aid of emulsifier(s). In an exemplary embodiment, the atom contributing the most to X-ray attenuation is silicon and the material is a silicon-based polymer.

In an exemplary embodiment, the invention provides a contrast medium formulation that may also be delivered into the digestive system and other bodily cavities that may be natural such as the vagina or bladder, or surgically created such as neobladders, or artificial medical devices such as tubes, catheters, pouches, reservoirs, or pumps.

Additional illustrative advantages, objects and embodiments of the invention are set forth in the description that follows.

BRIEF DESCRIPTION OF THE DRAWINGS

FIG. 7. Silicon-based polymer, and silicon-based polymer emulsions, were imaged in a CT phantom. The silicon-based polymer emulsions showed unusually high and consistent 80:140 kVp CT number ratio values between 2.70 to 2.77 and show 100:140 kVp CT number ratio values of 1.77 to 1.80. These values are much higher than that of iodinated or barium-based agents, which show 80:140 kVp CT number ratios of approximately 1.7 to 1.76. The silicon-based polymers were from Fisher Scientific (silicone oil, Catalog #S159) or from Sigma-Aldrich, and fluorinated silicon-based polymer was from Dow Corning (fluorosilicone oil, Catalog #FS-1265). Note: All the percent numbers for the formulations are weight/weight percentage (w/w %) except the isopropyl alcohol 70% (v/v %).

FIG. 8. CT number in Hounsfield Units (HU) derived from virtual monochromatic images from dual energy CT scans of formulations including a dilute gadolinium chelate solution, an iohexol solution, a silicon dioxide suspension, a pure silicon-based polymer oil, and a 75% emulsion of silicon-based polymer oil. Silicon-based polymer was obtained from Fisher Scientific (Catalog #S159). At 40 keV, the silicon-based polymer and silicon-based polymer emulsions showed high CT numbers greater than 300 HU and appear as "positive contrast". At 140 keV the silicon-based polymer and silicon-based polymer emulsions showed negative CT numbers lower than −20 HU and appear as "negative contrast". Water (always 0 HU+/−20 HU) and soft tissues fall in the range of −10 HU to 60 HU, and substances at this range are termed "neutral" in contrast. Note that while iohexol, an iodinated contrast agent, achieves positive contrast and neutral contrast at the low and high range of virtual monochromatic CT images, respectively, it does not achieve a value that falls in the range of a "negative" contrast material. Values for human fat and olive/canola oil are shown for comparison. Representative corresponding images are shown in FIG. 2.

FIG. 10 A list of commonly used surfactants and emulsifiers in the cosmetic, food or pharmaceutical industry is referenced as examples of emulsifiers of use in the formulations of the present invention. Hydrophilicity-lipophilicity balance (HLB) value is a physiochemical parameter to evaluate the affinity of a surfactant molecule with water (or with oil): the higher the HLB value, the more hydrophilic and less lipophilic the surfactant molecule is. HLB values ranges from 0-20 generally. In various embodiments, surfactants with HLB between about 9 and about 18 are favored to form water-in-oil (O/W) type emulsions of silicon-based polymers during emulsification. Note: Exemplary stable oil-in-water (o/w) type emulsions are prepared using emulsifiers with HLB values between 9 to 18.

FIG. 13: Silicone based contrast materials show similar CT numbers and 80:140 kVp CT number ratios when scanned on General Electric (GE) and Siemens CT scanners. CT numbers were measured at CT tube potentials of 80, 100, 120, and 140 kVp on commercial clinical dual energy CT scanners. For General Electric, the scanner was a 750 HD. For Siemens, the scanner was a Somatom Definition. The Readi-Cat™ contrast material contains 2.1% w/v barium sulfate in aqueous suspension. The silicone oil is 350 cst from Sigma Aldrich. The 70% w/w silicone oil emulsion is prepared in distilled water with 0.25% Tween-20.

FIG. 14: Silicone oil and its aqueous (oil-in-water) emulsions show markedly high and consistent 80:140 kVp CT number ratios of 2.4 or higher, regardless of the underlying viscosity of the silicone oil (measured in cSt). Cross-linked silicone rubber, fluorosilicone oil, and silicone dioxide show lower 80:140 kVp CT number ratios, but higher CT numbers.

DETAILED DESCRIPTION OF THE INVENTION

I. Introduction

Figure 1:
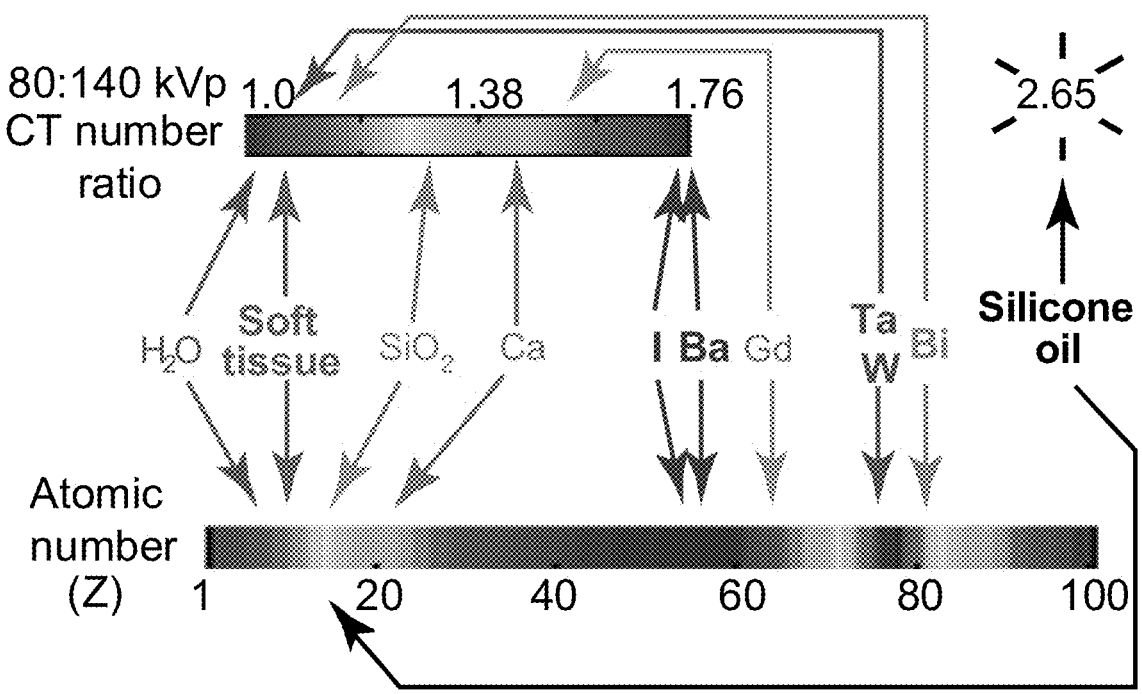
FIG. 1 is a computer simulation of 80:140 kVp CT number ratios for individual atoms with range of atomic number from 1 to 100. This simulation was based on the expected CT X-ray tube output spectrum of a clinical CT scanner and the National Institute of Standards and Technology X-ray attenuation coefficients of the individual elements. This simulation correctly predicts that conventional iodine- and barium-based CT contrast agents (I and Ba, respectively) have high 80:140 kVp CT number ratios of nearly 1.7, that calcium based materials such as bone have intermediate 80:140 kVp CT number ratios of slightly over 1.4, and that silica ($SiO_2$) has an intermediate 80:140 kVp CT number ratio of about 1.27. However, this model did not predict that any simple material would have a very high 80:140 kVp CT number ratio over 2.5, or even over 1.8. As such, the finding that silicon-based polymer, exemplarily polydimethylsiloxane (PDMS), has such a high 80:140 kVp CT number ratio (2.6-2.8) was not initially anticipated.
Figure 2:
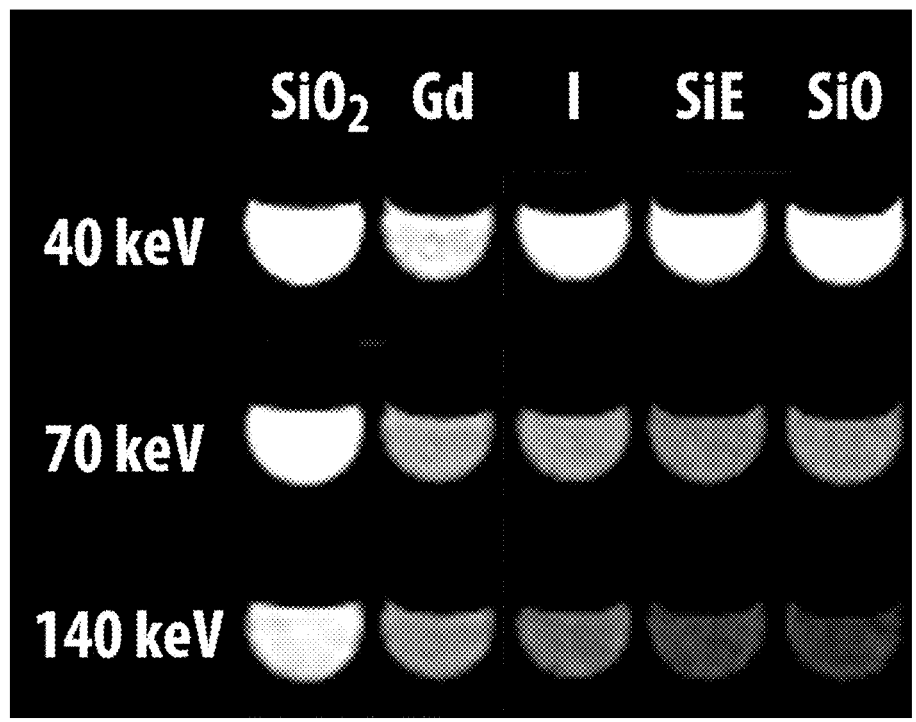
FIG. 2. Silicon-based polymer emulsion and silicon-based polymer provide both "negative" and "positive" contrast in vitro. Vials of silica ($SiO_2$), gadolinium chelate (Gd), iohexol (I) and 75% silicon-based polymer emulsion with 1% Tween-20 emulsifier (SiE) in water as well as pure silicon-based polymer oil (SiO) imaged with dual energy CT and reconstructed as virtual monochromatic images at 40 keV, 70 keV, and 140 keV (rows). The $SiO_2$ and Gd lose signal slightly in CT number between 40 and 140 keV. The iohexol iodinated contrast loses substantial signal between 40 and 140 keV. The SiE and SiO show the most signal loss between 40 and 140 keV and are also very unusual in that they show negative CT numbers even lower than that of water at 140 keV. The CT numbers of these agents are shown in FIG. 8.

Dual energy and spectral CT is a standard capability of modern scanners. Current dual energy technology allows simultaneous imaging of patients with X-rays of two or more different energy spectra, such as are generated by setting one X-ray tube potential to 80 kVp to generate one X-ray spectrum and then setting another X-ray tube potential to 140 kVp to generate a second X-ray spectrum. Alternatively, the X-ray tube potentials can be rapidly alternated between a low and a high kVp setting. The X-ray energy spectra from these tube potentials can be further modified by selective filtering of the low or high kVp X-ray beam, such as by use of a tin filter on the high kVp X-ray beam, to achieve better spectral separation. Dual energy and spectral CT imaging can also be acquired using other methods, including sandwich detectors or photon counting which quantify the X-ray attenuation of different portions of an X-ray spectrum. Materials in the body are differentiated based on differences in their high to low tube potential CT number ratios (e.g. 80:140 kVp CT number ratios), which are related to the atomic numbers of the atoms in the material. A simulation of CT number ratios for a clinical CT scanner shows that iodine and barium exhibit high 80:140 kVp CT number ratios of approximately 1.7, which is near the maximum value predicted for current clinical scanners, with CT numbers measured by the Hounsfield Unit. Materials with more widely different ratios are more clearly differentiated by DECT, hence iodine and barium can be differentiated quite well from water or most soft tissues, which have 80:140 kVp CT number ratios of about 1.0. Materials with intermediate 80:140 kVp CT number ratios (1.25 to 1.45) can be differentiated somewhat from both water or most soft tissues as well as iodinated or barium contrast material by the use of three-material decomposition algorithms. The best elements to incorporate into contrast material to allow differentiation from iodine and barium were thought to have low ratios close to 1.0 (correspond to high atomic numbers, e.g., between 71 and 83, or also low atomic numbers, e.g., between 3 and 20). Such paired contrast materials can be separated by simple two-material decomposition algorithms, but these low 80:140 kVp CT number ratio material would not be readily separated from water and soft tissue, even by use of three-material or multi-material decomposition algorithms.

Materials that are imaged with dual energy or spectral CT can be digitally separated by the the low energy to high energy X-ray spectra CT number ratios (for example, 80:140 kVp CT number ratios) of each material. The digital separation ("material decomposition") may be performed on the projection data (the data from the detectors prior to reconstruction of CT images) or may be performed on the CT images. The simplest method for digital separation is 2-material decomposition whereby signal from each voxel is proportionally assigned to one or another material based on the low energy to high energy X-ray spectra CT number ratio. This method generates two images, one which represents the signal assigned to one material, and the other which represents the signal assigned to the other material. A slightly more complex 3-material decomposition method can be used to separate three materials based on the low energy to high energy X-ray spectra CT number ratios of three materials and on the assumption that the sum of the fractional densities of the three materials is 1.0. Multi-material decomposition can be obtained by iterative application of 3-material or 2-material decompositions to solve for CT signal contribution from 3 or more materials. All of these methods can also be used to generate virtual monochromatic CT images, which are extrapolated images that represent what the imaged object would have looked like at different monochromatic X-ray CT imaging, assuming that the object was composed entirely of the materials assumed in the material decomposition method. The decomposition methods may be performed on images (for example, on the 80 and 140 kVp CT images), or on the projection space CT data, which are the data received by the X-ray detectors, with or without post-processing and filtering, prior to their being reconstructed into a CT image.

Some high atomic number elements have 80:140 kVp CT number ratios close to 1.0 and so are readily differentiated from iodine and barium contrast material at dual energy CT by material decomposition algorithms. Such high atomic number elements include tantalum (Ta, Z=73), tungsten (W, Z=74), bismuth (Bi, Z=83) ytterbium (Yb, Z=70) and gold (Au, Z=79) which are among the least toxic of the heavy atoms. Since the 80:140 kVp CT number ratios for such contrast materials are very similar to water and soft tissue, the commercial iodine versus soft tissue density material decomposition, available from every CT scanner vendor provide very good to excellent separation of iodine and the these agents even without contrast-specific software optimization—the signal from these agents is seen mostly, if not exclusively, in the "water/soft tissue" density map, but not the iodine map, on a two-material decomposition separation. Downsides of these high-Z agents are 1) their general high cost, relatively limited availability on earth, and concerns for patient safety; 2) the inability of these agents to be readily differentiated from soft tissue or water at dual energy or spectral CT since the 80:140 kVp CT number ratios or the high-Z agents are similar to that of soft tissue or water; and 3) their high X-ray attenuation coefficients compared to that of soft tissue, which results in formulations containing substantial amounts of these agents to appear as "positive" signal contrast material regardless of the kVp setting or monochromatic keV image reconstruction.

Low Z number elements have not been widely explored as reporter atoms for CT or X-ray contrast material. Specifically silicon-based polymers have not been previously described as the X-ray attenuating component of enteric CT or X-ray contrast material. The present invention provides safe formulations of silicon-based polymers that may serve as safe and effective materials for enteric contrast agents. These materials are readily differentiated from conventional commercially available iodinated and barium based contrast materials using simple two-material decomposition. Furthermore, some of these materials may have 80:140 kVp CT number ratios above 2.5 and therefore may also be differentiated from water and soft tissue as well as iodinated/barium based contrast material by using three-material and multi-material decomposition. Potentially, further advances in CT technology will allow for greater ability to distinguish between materials with different X-ray absorption ratios at different X-ray energy spectra.

For medical diagnostic imaging, the X-ray attenuation coefficient, and thereby the CT attenuation number at a fixed concentration, of a contrast material increases exponentially with the effective atomic number of the material [R. C. Murry, Effective atomic numbers of heterogeneous materials, Nature. 1965; 207, 398-399]. The effective atomic number of a material depends on the reporter atom(s), which are the atoms in the material that contribute the most to the X-ray attenuation of the material at imaging. Historically, only high atomic number reporter atoms such as iodine (Z=53) or barium (Z=56) have been used as reporter atoms for "positive" contrast materials, which are contrast materials with a substantially higher CT number than water or soft tissue. High concentrations of low-atomic-number materials have not been described for use with CT as a positive contrast material. Furthermore, no CT or X-ray contrast has been described that provides both "positive" and "negative" signal depending on image reconstruction technique. For the first time, the present invention provides an effective, low-cost enteric contrast medium, and formulations of this medium, based on silicon-based polymers for X-ray and CT imaging, including Dual Energy and spectral CT. This contrast material can provide both "positive" and "negative" signal, depending on image reconstruction technique.

The unusually high 80:140 kVp CT number ratios of some silicon-based polymers are not only very different from those of conventional iodinated or barium contrast agents, but also very different from the soft tissues, allowing digital separation of this novel type of contrast material from both the conventional contrasts and from the soft tissue by use of three material or multi-material decomposition algorithms.

II. Definitions

Unless defined otherwise, all technical and scientific terms used herein generally have the same meaning as commonly understood by one of ordinary skill in the art to which this invention belongs. Generally, the nomenclature used herein and the laboratory procedures in organic chemistry, pharmaceutical formulation, and medical imaging are those well known and commonly employed in the art.

The articles "a" and "an" are used herein to refer to one or to more than one (i.e. to at least one) of the grammatical object of the article. By way of example, "an element" means one element or more than one element. Contrast agents with iodine, barium or other atoms with Z greater than 52 are exemplary "high Z" materials.

Designation as "high-Z" or "low-Z" materials is based on comparison of the reporter atom atomic number to the atomic number of iodine (Z=53) and barium (Z=56) which are the most commonly used reporter atoms in clinical contrast agents available for current CT and X-ray imaging.

"Contemporaneous" administration refers to use of a contrast agent in conjunction with a medical imaging procedure performed on a subject. As understood by one of skill in the art, contemporaneous administration of the contrast agent to the subject includes administration during or prior to the performance of the medical imaging procedure such that the contrast agent is visible in the medical image of the subject.

A "disease" is a state of health of an animal wherein the animal cannot maintain homeostasis, and wherein if the disease is not ameliorated then the animal's health continues to deteriorate.

The term "half-life" or "t½", as used herein in the context of administering an enteric contrast medium of the invention to a patient, is defined as the time required for enteric concentration of a drug in a patient to be reduced by one half. There may be more than one half-life associated with the contrast medium depending on multiple clearance mechanisms, redistribution, and other mechanisms well known in the art. Further explanation of "half-life" is found in Pharmaceutical Biotechnology (1997, D F A Crommelin and R D Sindelar, eds., Harwood Publishers, Amsterdam, pp 101-120). The term "residence time", as used herein in the context of administering an enteric contrast medium to a patient, is defined as the average time that the enteric contrast medium stays in the body of the patient after dosing.

As used herein, "pharmaceutically acceptable carrier" includes any material, which when combined with the conjugate retains the activity of the conjugate activity and is non-reactive with the subject's immune system. Examples include, but are not limited to, any of the standard pharmaceutical carriers such as a phosphate buffered saline solution, water, emulsions such as oil/water emulsion, and various types of wetting agents. Other carriers may also include sterile solutions. Typically such carriers contain excipients such as starch, milk, sugar, sorbitol, methylcellulose, certain types of clay, gelatin, stearic acid or salts thereof, magnesium or calcium stearate, talc, vegetable fats or oils, gums, glycols, or other known excipients. Such carriers may also include flavor, texture, and color additives or other ingredients. Compositions comprising such carriers are formulated by well known conventional methods.

As used herein, "administering" means oral administration, administration as a suppository, topical contact, intrarectal, intravenous, intraperitoneal, intramuscular, intralesional, intranasal or subcutaneous administration, intrathecal administration, or instillation into a surgically created pouch or surgically placed catheter or device, or the implantation of a slow-release device e.g., a mini-osmotic pump, to the subject.

The term "enteric contrast medium" as used herein is understood to mean a dry or unsuspended component or mixture of components comprising at least one X-ray absorbing substance and optionally at least one pharmaceutically acceptable excipient, which may itself include other components, e.g., taste-masking agents, antioxidants, wetting agents, emulsifying agents, etc. The unsuspended mixture may subsequently be dissolved, emulsified, or suspended in a suspending medium to form the enteric contrast medium formulation of the invention. Terms such as "suspending medium" and "pharmaceutically acceptable excipient", as used herein, refers to the medium in which the component(s) of the enteric contrast medium are emulsified or suspended.

"Enteric contrast medium formulation" as herein used means, unless otherwise stated, a pharmaceutically acceptable liquid or paste formulation for administration to a subject, which comprises at least one enteric contrast medium, and with or without at least one pharmaceutically acceptable excipient suspending the medium, and which is prepared by dissolving, emulsifying, or suspending an enteric contrast medium as herein described, e.g. in the form of a powder, emulsion or mash, in a pharmaceutically acceptable vehicle, before use for administration to the subject. Preferably the suspending medium is water.

The terms "coating" and "coated" as herein used are understood to include coatings which are biocompatible within an environment having an acidic, or a neutral, or a basic pH value. An exemplary coating is a hardened (cross-linked) surfactant or a commonly used surfactant (e.g. Tween 20), which encapsulates another component of the formulations of the invention, e.g., a liquid silicon-based polymer.

The terms "particle" and "particles" as used herein refers to free flowing substances of any shape which are larger than about 1 nm, such as crystals, beads (smooth, round or spherical particles), pellets, spheres, and granules.

The term "droplets" refers to the form of a water-immiscible liquid in an oil-in-water emulsion.

The term "taste-masked" as used herein refers to any formulation or particle, or oral pharmaceutical composition comprising an unpleasant tasting enteric contrast medium of the invention which has been treated to render it palatable and/or which does not substantially release the enteric contrast medium in the mouth, but rather for example in the stomach or the intestinal tract.

"An unpleasant and/or bitter taste" as used herein means that a majority of human patients judges said enteric contrast medium comprised as having an unpleasant and/or bitter and/or extremely bitter taste after ingestion.

Current clinical CT scanners can generate different X-ray spectra for imaging. The energy spectra depend mainly on the scanner tube potential (kVp) setting of the machine, which typically range from 80 to 140 kVp, but may be set higher or lower. These kVp settings result in CT scanners generating X-rays with a spectrum of energies, with the highest energy X-rays being 80 keV at a tube potential setting of 80 kVp, and 140 keV at 140 kVp.

The X-ray spectra can be modulated, for example, by passing the X-rays through a metal filter, e.g., aluminium, copper, or tin. For any given monochromatic X-ray energy passing through a known material, the extent of X-ray attenuation is defined by the Beer-Lambert law, and is proportional to a) the density of the atoms, b) the distance through the material which the X-ray passes, and c) the X-ray attenuation coefficient for that particular atom or material at that particular X-ray energy. Since the X-ray spectrum is relatively constant at any given kVp setting for a given scanner, the ratio of X-ray attenuation at 80 versus 140 kVp, as measured by Hounsfield Units (HU), can be determined for any given material. Generally, iodine and barium have an 80:140 kVp CT number ratio of about 1.7 to 1.8 when imaged with a standard CT scanner using an aluminum or copper filter, though substantially higher 80:140 kVp CT attenuation ratios may be obtained if a tin filter is used for the 140 kVp imaging (A. N. Primak, J. C. Ramirez Giraldo, X. Liu, L. Yu, and C. H. McCollough. Improved dual-energy material discrimination for dual-source CT by means of additional spectral filtration. Med. Phys. 36 (4), pp 1359-1369. April 2009). Water has, by definition, an 80:140 kVp CT number ratio of 1.0 since water is defined as having a CT number of 0 Hounsfield units for any given X-ray spectrum at CT. The elements of the periodic table have 80:140 kVp CT number ratios that range from about 0.9 to 1.8. Materials with more widely divergent 80:140 kVp CT number ratios are more readily distinguished at dual energy or spectral CT. Other methods for obtaining dual energy CT include the use of different tube potential settings (e.g. 100 kVp or 70 kVp rather than 80 kVp). Alternative methods for obtaining dual or multi energy CT are that the X-ray spectra may be modified to obtain greater separation of the energy spectra (e.g. by application of a tin filter to the high kVp setting X-ray tube) or other methods may be utilized to quantify the amount of absorption of different energy X-rays (e.g. sandwich detectors whereby the upper layer(s) of X-ray detectors block the low energy X-rays, thereby modulating the X-ray spectrum to which the lower layer(s) are exposed; photon counting detectors). These other methods still show limited ability to differentiate iodinated from barium-based materials, and can better differentiate materials with atoms of much different atomic number.

Virtual monochromatic CT images are image reconstructions obtained from dual energy or spectral CT data whereby the X-ray absorption of individual voxels of the image at the given monochromatic X-ray energy are estimates. One method to achieve virtual monochromatic CT images is to assume that the imaged object is composed entirely of two materials, such as iodine and water, and perform a two material decomposition based on the the dual energy or spectral CT data to determine the relative X-ray attenuation attributable to iodine and water to each voxel of the image. The virtual monochromatic CT image can then be back-extrapolated for any monochromatic X-ray energy by using the corresponding reference X-ray attenuation coefficients for iodine and water, such as may be found on the National Institutes of Standards and Technology, to determine the CT number at the corresponding X-ray energy for each voxel of the image. In this manner, virtual monochromatic images are obtained for a wide range of keVs, such as 40 keV, 140 keV, 200 keV, or any value in between or otherwise. Similarly, three material and multimaterial decomposition may be used to back-extrapolate virtual monochromatic CT images as well.

Where substituent groups are specified by their conventional chemical formulae, written from left to right, the structures optionally also encompass the chemically identical substituents, which would result from writing the structure from right to left, e.g., —CH$_2$O— is intended to also optionally recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated $C_{9-10}$, oleoyl chain or the diunsaturated $C_{9-10, 12-13}$ linoeyl chain.

The term "alkylene" by itself or as part of another substituent means a divalent radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, P, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl", and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system. Each of the above-named groups is attached to the heteroarene or heteroaryl nucleus directly or through a or a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$)alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), phosphorous (P), sulfur (S) and silicon (Si) and boron (B), and halide (F, Cl, Br or I).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

III. Embodiments

A. Compositions

In various embodiments, the present invention provides non-iodinated enteric/non-vascular CT contrast material that can be readily differentiated from available CT contrast materials on the market or that have been thus far described in the literature. These silicon-polymer based materials have a markedly different relative X-ray attenuation at different kVp settings than conventional iodinated/barium CT contrast materials and heavy metal-based contrast materials. Novel silicon-polymer based contrast materials are readily distinguished from conventional iodinated and barium CT contrast materials as well as from soft tissue and water at dual energy CT, and these agents can distinguished by commercial or "home grown" dual energy CT (DECT)/spectral CT software when dual energy/spectral CT images are obtained. At low energy virtual monochromatic CT images, such as 40 keV, the materials may show "positive" contrast signal, and at high energy virtual monochromatic CT images such as 100 to 140 keV the materials may show "negative" contrast signal. Thus, the agents of the present invention allow for the first time access to a wide range of improved CT applications with one or more of the following benefits:

1) bowel or non-vascular structures can be opacified to distinguish these structures from opacified vascular structures at CT;
2) the origin of extravasated contrast material can be readily distinguished as being vascular or non-vascular in origin;
3) contrast-enhanced CT images of the vascular and non-vascular structures can be obtained simultaneously/near simultaneously and thereby allow perfect co-registration yet differentiation of these structures; and
4) enteric/nonvascular structures can be opacified with contrast for CT without interfering with the assessment of mural enhancement of those structures (bowel wall, bladder wall, other walls) from intravenous contrast.

In various embodiments, the invention provides enteric contrast materials based on silicon-based polymer in the form of an oil or other non-water-miscible liquid, gel, rubber, and resin. In various embodiments, the silicon-containing oils can be selected to have a very high ratio of CT attenuation at 80 versus 140 kVp of greater than 2.1, and may be even higher than 2.7; or a lower ratio of 1.38, depending on relative number of other different atoms incorporated into the oil such as fluorine or heavy atoms.

The benefits of the agents of the invention are a result of the novel properties of the agents. In a CT scan, conventional CT contrast materials all look the same—they all cause increased X-ray attenuation (positive contrast) when present and cannot be distinguished except by context. Using dual-energy CT, materials can be differentiated when they have markedly different CT attenuation ratios at different tube potentials, such as at 80 versus 140 kVp. For example, the CT attenuation ratio of iodinated or barium-based CT contrast material has an 80:140 kVp CT number ratio of between 1.7 and 1.8. In a computer simulation, it was shown that contrast agents including atoms with a high (z=70 to 82) or low (z<20) atomic number as the reporter atom are theoretically complimentary to iodine- or barium- (z=53 and 56, respective) based contrast agents because such agents could have 80:140 kVp CT number ratios of <1.35. Notably, the 80:140 kVp CT number ratio of water is by definition 1.0. In the simulations, iodine- and barium-based contrast materials had the highest theoretical 80:140 kVp CT number ratios of the elements on the periodic table. It was not predicted that any agent could have a substantially higher 80:140 kVp CT number ratio than iodinated or barium-based agents. FIG. 1.

Thus, it is indeed surprising that in vitro experiments showed that materials could exist or be created that have substantially higher 80:140 kVp CT number ratios than 1.8, and as high as 2.7 or greater. In a mixed solution imaged with DECT, the concentrations of two contrast materials with markedly different 80:140 kVp CT number ratios are much more accurately quantified than are contrast agents with 80:140 kVp CT number ratios that are more similar to each other. The concentrations of iodine- and barium-based agents could not be quantified with much accuracy because their 80:140 kVp CT number ratios are nearly identical. The present invention of polysiloxane-based contrast material provide by far the largest difference in 80:140 kVp CT number ratios compared to soft tissue, water, and iodinated/barium contrast material of any compounds previously described in the literature. In other words, these agents are more readily distinguishable from other contrast agents and from soft tissue than any other experimental or conventionally available agent. Also, these silicon-polymer based agents are known to be of minimal and acceptable toxicity.

Thus, in an exemplary embodiment, the invention provides an enteric contrast medium formulation which is formulated for oral delivery to a subject prior to or contemporaneous with a medical imaging procedure performed on the abdomen of the subject. An exemplary formulation includes an enteric contrast medium comprising an emulsion or suspension of at least one silicon-based polymer, an aqueous component, and an emulsifying and/or encapsulating agent. The emulsifying agent maintains the at least one silicon-based polymer in an oil-in-water emulsion with the aqueous component which is a pharmaceutically acceptable aqueous vehicle. Another exemplary formulation includes an enteric contrast medium comprising at least one liquid silicon-based polymer without an aqueous component.

In an exemplary embodiment, the invention provides an enteric contrast medium, and a formulation thereof readily differentiated from other currently available contrast materials. The invention is illustrated by reference to an enteric contrast medium formulation. An exemplary formulation includes an enteric contrast medium comprising an emulsion or suspension of at least one silicon-based polymer, an aqueous component, and an emulsifying and/or encapsulating agent. The emulsifying agent maintains the at least one silicon-based polymer in an oil-water suspension or emulsion with the aqueous component which is a pharmaceutically acceptable aqueous vehicle (FIG. 7). In various embodiments, the particles are coated with a material compatible with enteric administration of the formulation to a subject in need of such administration.

In an exemplary embodiment, the silicon-based polymer is an oil represented by linear polysiloxanes. An exemplary silicon-based polymer of use in the compositions of the invention has the formula:

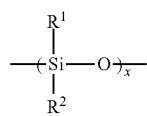

in which $R^1$ and $R^2$ are independently selected from substituted or unsubstituted alkyl, substituted or unsubstituted heteroalkyl, substituted or unsubstituted aryl and substituted or unsubstituted heteroaryl moieties. In various embodiments one or both of $R^1$ and $R^2$ is substituted or unsubstituted alkyl, e.g., $C_1$-$C_{30}$ alkyl. The subscript "x" here refers to the degree of polymerization for the silicon-containing polymer.

In an exemplary embodiment, $R^1$ and $R^2$ are independently selected from substituted or unsubstituted monovalent hydrocarbon group having 1 to 30 carbons, or a hydroxyl group, or a siloxyl group. Examples of the unsubstituted monovalent hydrocarbon group include alkyl groups such as methyl, ethyl, propyl, butyl, pentyl, hexyl, heptyl, octyl, nonyl, decyl, dodecyl, tetradecyl, hexadecyl, and octadecyl; cycloalkyl groups such as cyclopentyl, and cyclohexyl; aryl groups such as phenyl; and aralkyl groups such as 2-phenylethyl, and 2-phenylpropyl. Substituted monovalent hydrocarbon groups are those obtained by substituting the hydrocarbon group with a functional group. Examples of the functional groups include halogen, epoxy, amino, mercapto, acryloxy, methacryloxy, fatty acid ester, carboxyl, hydroxyl, alkoxy, and poly(alkylene oxide). Among them, methyl, ethyl, propyl, and/or phenyl are preferable, and 50% by mole or more of alkyl groups is particularly preferable.

The molecular structure of the siloxane may have not only a linear chain but also a branched structure, and preferably has a linear chain structure. The organopolysiloxane of use in the present invention can be prepared by methods known to a person skilled in the art. Specific examples include, without limitation, polyorganosiloxanes, or "silicones" including dimethyl silicones, phenylmethyl silicones, methylhydrogen silicones, alkylaralkyl-modified silicones, fluorine-modified silicones, amino-modified silicones, amino-modified polyether-modified silicones, and amide-modified silicones.

Further useful silicon-based polymers include, without limitation, hyperbranched polysiloxanes, copolymers of two or more polysiloxanes, optionally including one or more type of substituent, copolymers between a polysiloxane and another polymer, optionally including one or more type of substituent, blends of more than one polysiloxane or a polysiloxane and another polymer (e.g., silicone rubbers, silicone resins, etc.), and shell hardened polysiloxanes. Other polymers here include but are not limited to polycarbonates, polyalkylene glycols, and polyurethanes.

Specific examples of silicon-based polymers of use in the invention include polysiloxanes such as methylpolysiloxane, highly polymerized methylpolysiloxane, dimethylpolysiloxane, methylphenylpolysiloxane, methylhydrogenpolysiloxane, methylcyclopolysiloxane, polyoxyethylene/methylpolysiloxane copolymers, crosslinked methylpolysiloxane, and crosslinked methylphenylpolysiloxane; modified silicones such as polyether-modified silicones, fatty acid-modified silicones, acrylic-modified silicones, fluorine-modified silicones, amino-modified silicones, and alkyl-modified silicones; cyclic silicones such as decamethyltetrasiloxane, octamethylcyclotetrasiloxane, octamethylcyclopentasiloxane, decamethylcyclopentasiloxane, dodecamethylcyclohexasiloxane, and methylcyclopolysiloxane; and the like.

One or two or more silicon-based polymers may be used together.

Exemplary compounds and exemplary emulsions thereof are set forth in FIG. 7.

The silicon-based polymers may be linear ones as oils of varying viscosities or crosslinked ones as gels or resins or rubbers, and may also be in the form of an emulsion derived from the oil state. The emulsion is preferably stable to storage at ambient or lower temperatures. "Stable" in this context refers to emulsions that do not significantly separate into their components as different phases between manufacture of the emulsion and its administration to a subject in an imaging study.

Figure 11:
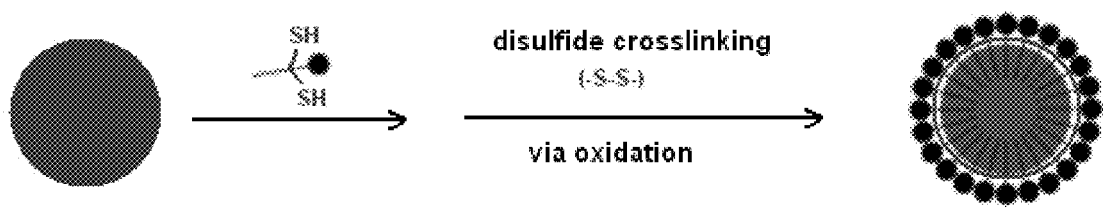
FIG. 11. Shell-hardened polysiloxane emulsions. Cross-linking groups can be introduced near the hydrophilic region of the emulsifier molecule. First, the emulsification of the silicon-based polymer oil is conducted in water in the presence of such crosslinkable surfactant; next the second step is applied, namely the intraparticle crosslinking of numerous such groups (e.g., thiol groups) on the surface of an oil microdroplet. This crosslinking may further stabilize the emulsion particle by providing a "hardened" shell.
Figure 12:
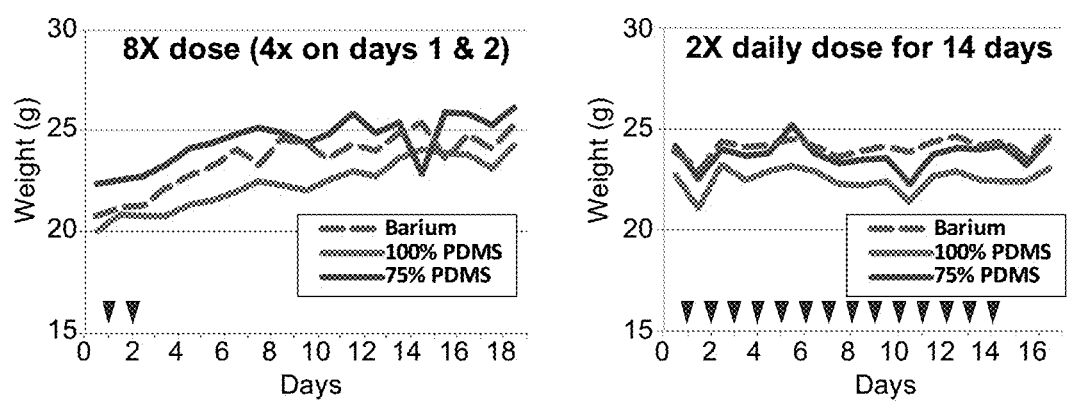
FIG. 12: High dose gastric gavage of barium 2.1% w/v, 100% PDMS (silicone oil 350 cst from Sigma Aldrich), or 75% PDMS emulsion (silicone oil 350 cst from Sigma Aldrich emulsified in distilled water with 0.25% tween 20) in Swiss-Webster mice in a non-GLP study. Each data point is average of 3 mice. No obvious toxicity was seen in mice after 4× dose on days 1 and 2 observed for a total of 19 days (left graph), or for mice given 2× daily dose for 14 days and observed for a total of 17 days (right graph). Within each cohort, no significant difference was seen in growth curve trajectories of mice that received silicone oil or silicone oil emulsion compared to control mice (barium sulfate 2.1% w/v). No gross internal organ injury was seen in any mouse at sacrifice.
Figure 15:
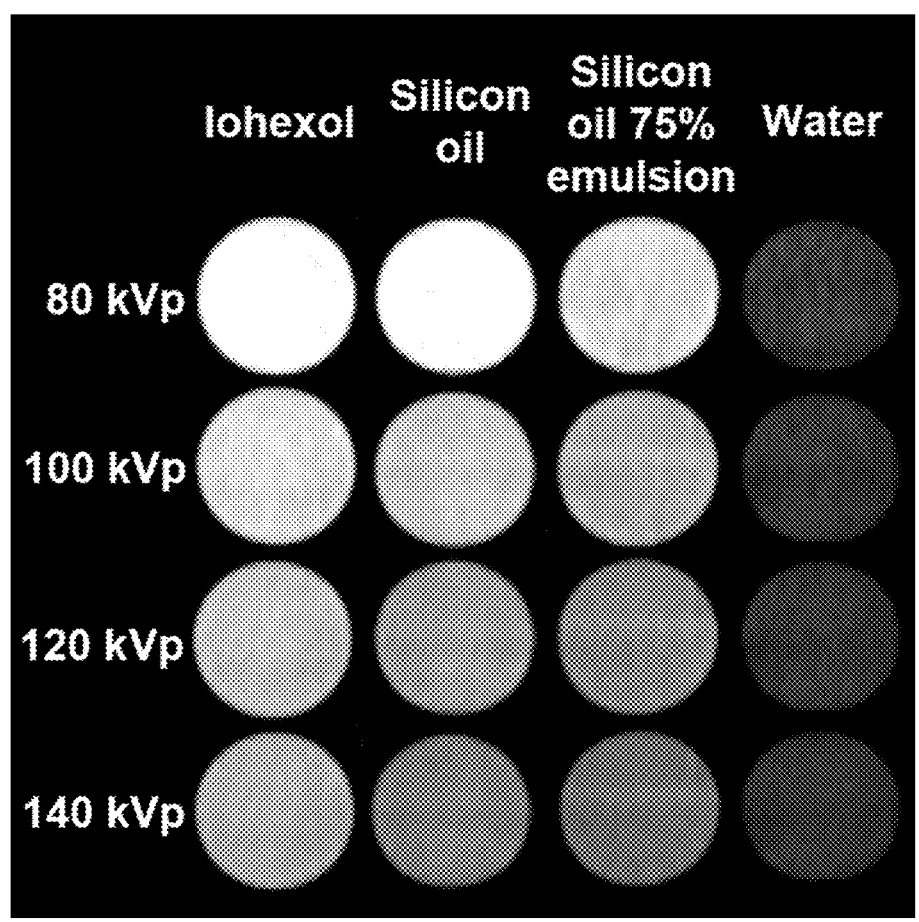
FIG. 15: Selected corresponding CT images to FIG. 13 and FIG. 14. Vials of diluted iodinated contrast material (iohexol, 5 mg I/mL), 100% 350 cst silicone oil (Sigma Aldrich), silicone oil 75% emulsion of Sigma Aldrich 350 cSt oil in water, and water were scanned at 80, 100, 120, and 140 kVp X-ray tube settings. The iodinated contrast material shows less intense signal (lower CT number) at higher kVp X-ray tube settings than at lower settings. The silicone oil and silicone oil emulsions show even more substantial loss of signal at high than at low kVp X-ray tube settings. Water does not change in CT number with changes in kVp X-ray tube setting. The substantially greater relative decrease in CT number of silicone oil as kVp X-ray tube setting increases compared to what is seen with iodinated contrast material allows dual energy CT to differentiate iodinated from silicone based contrast material. Since water and soft tissue does not change in relative CT number at different kVp settings, both iodinated and silicone-based contrast material can be differentiated from water and soft tissue.

Any useful surfactant or combination of surfactants can be utilized in the formulations of the invention. Exemplary surfactants of use in the invention are set forth in FIG. 10. In various embodiments, the surfactant is hardened, i.e., cross-linked, forming a shell around another component, e.g., a silicon-based polymer, of the formulation. FIG. 11.

Silicon-based polymers are known to those of skill in the art. Essentially any silicon-based polymer is of use in the methods of the invention. Preferred polymers selected for their ability to absorb or attenuate X-rays and markedly high 80:140 kVp CT number ratio, are essentially non-toxic at dosages useful for imaging experiments, are stable to physiological conditions and are readily eliminated by the subject following the imaging procedure.

Exemplary silicon-based polymers of use in the formulations of the invention can be of substantially any molecular weight. For example, polymers within the molecular weight range of from about 0.4 kd to about 1,000 kd, e.g., about 1.5 kd to about 500 kd, e.g., from about 2 kd to about 100 kd, e.g., from about 1.5 kd to about 70 kd, are of use in the present invention.

In various embodiments, the degree of polymerization (DP) is from about 5 to about 14000, or more preferably from about 20 to about 1000.

Exemplary silicon-based polymers of use in the formulations of the invention include silicon-based polymers having a specific gravity similar to that of water (e.g., from about 0.9 to about 1.1).

In various embodiments, the silicon-based polymer has a viscosity of from about 0.5 cSt to about 10,000,000 cSt at room temperature (25° C.). In various embodiments, the silicon-based polymer has a viscosity of from about 5 cSt to about 100,000, e.g., from about 5 cSt to about 200 cSt at room temperature. In various embodiments, the silicon-based polymer has a viscosity of from about 200 cSt to about 600 cSt at room temperature. In various embodiments, the silicon-based polymer has a viscosity of from about 600 cSt to 1200 cSt at room temperature. In various embodiments, the silicon-based polymer has a viscosity of from about 1200 cSt to about 100,000 cSt at room temperature.

Exemplary enteric contrast medium formulations of the invention include one or more silicon-based polymer that is liquid at room and/or body temperature (e.g., fluorosilicone polymer, branched silicon-based polymer, silicon-based polymer gels, and silicon-based polymer solids).

In an exemplary embodiment, the contrast medium is formulated into a pharmaceutically acceptable vehicle in which the polymer is emulsified or suspended.

In various embodiments, the polymer, e.g., silicon-based polymer, accounts for about 10% (w/w %) to 100% (w/w) of the weight of said formulation, preferably 50-90% (w/w %).

In various embodiments, the silicon-based polymer is hardened. Hardened silicone is known in the art. In exemplary embodiments, the silicon-based polymer includes a base material according capable of undergoing addition curing. Exemplary forms of addition curing include cold hardening (that is, they harden at room temperature) and self-hardening systems. In various embodiments, hardening is a catalyzed addition reaction that occurs by hydrosilylation, a conversion of organohydrogen polysiloxanes (polysiloxane, that has organic groups, and Si—H bonds) to polysiloxane, comprising polyatomic cross-linkable groups, generally unsaturated cross-linkable groups, and preferably (possibly substituted) alkenyl groups, particularly vinyl groups or allyl groups.

In an exemplary embodiment, the hardened silicone forms a shell around a silicon-based polymer that is not hardened.

In various embodiments, the enteric contrast medium of the invention includes a coating, which optionally comprises a water-soluble polymer. As those of skill in the art appreciate, water soluble polymers appropriate for application in the present invention include, without limitation, a poly (alkylene oxide), a poly(amino acid), a poly(ester) polymer, a polysaccharide, a protein, polyvinylpyrrolidone, a poly (vinyl) polymer, a poly(ethylene imine) polymer, a poly (acrylic) polymer, a poly(siloxane) polymer, PAMAM dendrimers and other dendrimers, and a combination thereof, as well as those water-soluble polymers discussed herein.

Whether they are hardened silicon-based polymers, water-soluble polymers or otherwise, coating polymers incorporated into the contrast media of the invention can be of substantially any molecular weight. For example, polymers within the molecular weight range of from about 0.4 kd to about 1,000 kd, e.g., about 1.5 kd to about 500 kd, e.g., from about 2 kd to about 100 kd, e.g., from about 3 kd to about 70 kd, are of use in the present invention.

In an exemplary embodiment, the coating comprises an organic molecule with a molecular weight of less than about 3 kd, less than about 2 kd or less than about 1.5 kd. In an exemplary embodiment, the coating comprises an organic molecule with a molecular weight of less than about 3 kd, less than about 2 kd or less than about 1.5 kd, which is a member selected from an organic acid (or alcohol, amine) and its derivatives or analogs, an oligosaccharide and a combination thereof.

In an exemplary embodiment, the coating is a protein, e.g., albumin.

The suspended phase of formulations of the invention can include droplets or particles of any useful size. Exemplary specific sizes for the droplets and/or particles include from about 1 nm to about 500 microns, e.g., 1 nm to about 500 microns, e.g., 1 micron to about 100 microns encompassing each single diameter value and each diameter range within the larger range across all endpoints; in various embodiments, the droplets and/or particles are greater than about 50 microns. Further useful droplet and/or particle sizes include, for example, from about 5 microns to about 50 microns, e.g., from about 30 microns to about 50 microns. The size of emulsion particle can be adjusted by varying the surfactant/oil mole ratio, temperature at emulsification, duration and intensity of the emulsification step.

Although the emulsion is the main targeted formulation derived from the polysiloxane oils, the formulation of the invention can take the form of any type of suspension, colloid, emulsion, or solution, for example aqueous solution. When the formulation of the invention is a mixture with vehicle, the formulation is in a form selected from a suspension, a colloid, an emulsion, a hydrogel and a combination thereof. The formulations of the invention can include a single enteric contrast medium or two or more enteric contrast media. The media can be present in similar concentrations according to any useful measure of concentration. An exemplary embodiment includes different concentrations of one or more element in the contrast medium. Thus, in various embodiments, from about 10% (w/w, expressed as a weight percent, e.g. about 10 grams of contrast agent compound contained in about 100 grams of total contrast formulation) to 100% (w/w) of the weight of said formulation is said droplets and/or particles. In an exemplary embodiment, the formulation includes about 50% (w/w) to about 90% (w/w) of the droplets and/or particles.

In an exemplary embodiment, the invention provides a formulation comprising at least about 30%, e.g., at least about 50% of said silicon-based polymer.

The formulations of the invention include a population of droplets and/or particles of the invention suspended in a pharmaceutically acceptable vehicle. The vehicle includes any other useful component. For example, in some embodiments, the vehicle comprises an aqueous medium, and it further comprises an additive to impart a second property to the formulation, for example, retard dehydration of said formulation in the bowel, provide flavoring, stabilize the suspension, enhance flowability of the suspension, thicken the suspension, provide pH buffering and a combination thereof.

Formulations of the invention are distinct both molecularly and functionally and can be recognized by both characteristics. For example, in one embodiment, the enteric contrast medium has an 80:140 kVp CT number ratio value of greater than or equal to about 2.5. Formulations with exemplary useful values for this ratio include those with an 80:140 kVp CT number ratio of from about 2.5 to about 2.9, e.g., from about 2.5 to about 2.8, e.g., from about 2.6 to about 2.9. This ratio value is readily determinable for any contrast medium of the invention by one of ordinary skill in the art.

In various embodiments, the formulations of the invention are imaged on dual energy or spectral CT scanners. In various embodiments, the dual energy or spectral CT scanners used to image the formulations of the invention employ different filters for the low and high kVp imaging, e.g., metal filters, e.g., aluminum or copper filters for the low kVp images and tin filters for the high kVp imaging. Use of such selective filters allow for greater spectral separation of the low and high kVp X-ray imaging beams and allow for superior material decomposition separation of the formulation of the invention from conventional iodinated or barium contrast material and from water and soft tissue.

In an exemplary embodiment, the invention provides an enteric contrast medium formulation, wherein the enteric contrast medium has an 80:140 kVp CT number ratio of greater than about 2.1. In an exemplary embodiment, the invention provides an enteric contrast medium formulation, wherein the enteric contrast medium has an 80:140 kVp CT number ratio from about 1.5 to 2.1. In an exemplary embodiment, the invention provides an enteric contrast medium formulation, wherein the enteric contrast medium has an 80:140 kVp CT number ratio of less than about 1.5.

In an exemplary embodiment, the formulation of the invention includes a second contrast medium different from the first contrast medium. The second contrast medium can be soluble or insoluble in the pharmaceutically acceptable vehicle. When the second contrast medium is a particulate agent, the second contrast medium can include different atoms in the particulate core, a different coating, be of a different diameter, etc. relative to the first contrast medium. The second contrast medium can also be one or more of an iodinated, Ba-, Gd-, Bi-, W-, Mg-, Ta-, Yb-, or other Si-based contrast medium.

In an exemplary embodiment, the second contrast medium component is an iodinated oil, similar but not limited to an example like Lipiodol.

In an exemplary embodiment, the second contrast medium is a Mg-based medium, e.g., $Mg(OH)_2$.

Within the scope of the invention are formulations designed for single dosage administration. These unit dosage formats contain a sufficient amount of the formulation of the invention to provide detectable contrast in a subject to whom they are administered. In an exemplary embodiment, the unit dosage formulation includes a container holding sufficient contrast medium to enhance, in a diagnostically meaningful manner, a diagnostic image of a subject to whom the unit dosage has been administered. The container can be a vial, an infusion bag or any other appropriate vessel. The contrast medium may be in the form of a preformulated liquid, a concentrate, or powder. In an exemplary embodiment, the subject weighs about 70 kg. In an exemplary embodiment the image is obtained through the abdomen of the subject, the pelvis of the subject, or a combination thereof.

In various embodiments, the unit dosage formulation includes from about 800 to about 1200 mL of the contrast agent per adult human dose, which may be divided into smaller containers such as from about 300 to about 600 mL in size. In an exemplary embodiment, the enteric contrast medium formulation is a unit dosage formulation of from about 50 to about 100 mL. In an exemplary embodiment, the enteric contrast medium formulation is a unit dosage formulation of from about 100 mL to about 800 mL.

Any of the formulations described herein can be formulated and utilized for administration through any of a variety of routes. Exemplary routes of administration include oral, rectal, intravaginal, intravascular, intrathecal, intravesicular, intracatheter, and the like.

High concentrations of low-atomic-number materials have not been described for use with CT as a positive contrast material. In an exemplary embodiment, the low-Z contrast materials in the formulation are highly concentrated, e.g., about 100 to about 900 mg/g, e.g., about 150 to about 500 mg/g, e.g., about 200 to about 300 mg/g) in terms of atoms of the X-ray attenuating element ("key atoms" or "reporter atoms"). In an exemplary embodiment, the low-atomic-number materials of the enteric contrast medium account for from about 30% (w/w) to 100% (w/w), e.g., from about 50% (w/w) to about 90% (w/w) of the formulation. The concentrations herein refer to those of the key element(s) in the contrast material that contribute to the majority share of the X-ray attenuation (absorption/scatter), usually but not necessarily the element with the highest atomic number within the molecule. X-ray attenuation is a function of the X-ray attenuation coefficient of the individual atoms for the X-ray spectrum times the concentration of the atoms in the contrast formulation summed across the range of X-ray energies in the imaging X-ray spectrum.

In various embodiments, the invention provides a contrast medium formulation, which is a unit dosage formulation and it contains more than about 40 g of the silicon-based polymer. In an exemplary embodiment, the enteric contrast medium formulation is a unit dosage formulation and it contains more than about 300 g of the silicon-based polymer Since low-Z materials do not attenuate the X-rays used for medical CT as well as high-Z materials such as iodine, barium, gadolinium, or other atoms, higher molar concentrations of low-Z materials are needed to produce similarly intense X-ray attenuation as high-Z materials at CT. Thus, in an exemplary embodiment, the invention provides a formulation of an enteric contrast agent having higher concentration of the low-Z element than that of a high-Z element in known enteric contrast medium formulations.

Contrast materials for imaging must be very safe for a wide range of patients and disease states. Whether patients are diseased or relatively healthy, all would benefit greatly from imaging studies that have low risk for injury and toxicity. In an exemplary embodiment, the invention provides an enteric contrast medium with an $LD_{50}$>about 25 g/kg would give a good safety margin, and would be comparable to the $LD_{50}$ of conventional iodinated or barium contrast agents.

In various embodiments, the contrast medium of the invention and preferably its formulation exhibits chemical stability across a wide pH range (e.g., from about 1.5 to about 9). The stomach exposes enteric contents to low pH of 1.5 and bile and small bowel may expose enteric contents to high pH of up to 9. Physicochemical stability is a critical component of safety and helps minimize the risk of reactions or adverse events. Adverse reactions may occur if excessive dissolution or degradation of the materials were to occur in the gastrointestinal tract, or if the breakdown products are potentially toxic.

In various embodiments, the invention provides a contrast medium and a formulation of a contrast medium with a $t_{1/2}$ that is sufficiently long to allow the completion of an imaging experiment with the concentration of the silicon-based polymer remaining sufficiently high for visualization at CT within the region of interest. In various embodiments, the invention provides a contrast medium and a formulation having an in vivo residence time that is also reasonably short to allow essentially all of the administered silicon-based polymer emulsion formulation to be eliminated from the body of the subject before being destabilized or altered by the subject's body. In various embodiments, the silicon-containing polymer is a biologically-inert material with excellent biocompatibility.

In various embodiments, the enteric transit time of the formulation is less than 12 hours in normal subjects. In an exemplary embodiment, the formulation includes sorbitol, polyethylene glycol or both to accelerate enteric transit times.

In an exemplary embodiment, the invention provides a contrast medium that is biologically inert and dissolves slowly in water such that the majority of the administered silicon-based polymer are eliminated via the gastrointestinal tract prior to being altered by the subject's body, and a dissolved or altered portion excreted by the urinary tract.

In an exemplary embodiment, the invention provides an enteric contrast medium which has droplets or particles with a silicon-based polymer core. In various embodiments, the core is coated. The core can be coated with a polymer or with small molecules as discussed herein. The underlying core is essentially non-toxic in a preferred embodiment.

In an exemplary embodiment, the formulation of the invention avoids the risks associated with current homogeneous dispersion/formulation. For example, in current methods using current barium-based formulations, heterogeneous dispersion may cause imaging artifact that could be mistaken for or mask abnormal findings. Barium contrast agents have a tendency to flocculate or coat the mucosa of bowel, which can cause imaging artifact at CT.

The pharmaceutical formulation of the present invention may optionally include excipients and other ingredients such as one or more sweeteners, flavors and/or additional taste modifiers to mask a bitter or unpleasant taste, suspending agents, glidants, antioxidants, preservatives and other conventional excipients as needed.

The suspension of the invention may optionally include one or more antioxidants, if necessary, taste modifiers, sweeteners, glidants, suspending agents, and preservatives.

As will be appreciated, the above optional ingredients may be added to the powder formulation of the invention, and/or to the oral emulsion or suspension of the invention.

Antioxidants suitable for use herein include any convenient agents known in the art for this purpose such as sodium metabisulfite, sodium bisulfite, cysteine hydrochloride, citric acid, succinic acid, ascorbic acid, sodium ascorbate, fumaric acid, tartaric acid, maleic acid, malic acid, EDTA with sodium metabisulfite or sodium bisulfite being preferred.

Antioxidants may be employed in an amount which will protect the formulation from oxidation as will be apparent to one skilled in the art.

Sweeteners for use in the formulations of the invention may be any convenient agents known in the art for this purpose and may be selected from any compatible sweetener groups such as natural sweeteners like sucrose, fructose, dextrose, xylitol, sorbitol, or manitol, as well as artificial sweeteners such as aspartame, acesulfame, sucrolose. Xylitol, and aspartame are preferred sweeteners.

Flavors and flavor modifiers or taste modifiers can also be used to further improve the taste and can be any convenient agents known in the art for this purpose and include, but are not limited to, orange flavor, apricot flavor, chocolate flavor, maple flavor, marshmallow flavor, vanilla flavor, licorice flavor, orange vanilla flavor, creme de mint flavor, mint flavor, cherry flavor, cherry vanilla flavor, berry mix flavor, passion fruit flavor, mandarin orange flavor, bubble gum flavor, tropical punch flavor, juicy compound for grape, grape flavor, artificial grape flavor, grape bubble gum flavor, tutti-frutti-flavor, and combinations thereof.

Suspending agents can be any convenient agents known in the art for this purpose and can be selected from xanthan gum, guar gum, hydroxypropylmethyl cellulose, hydroxypropyl cellulose, polyvinyl pyrrolidone, alginates, and sodium carboxylmethylcellulose with sodium carboxylmethylcellulose ("Na CMC") being preferred. Suspending agents may be employed in an amount within the range from about 0 to about 20% by weight of the powder formulation, and from about 0 to about 10% by weight of the oral suspension.

Preservatives can be any convenient agents known in the art for this purpose and can be selected from the group consisting of any compound compatible with drug actives such as methylparaben and propylparaben, benzoic acid, sodium benzoate, potassium sorbate, with methylparaben being preferred.

The invention also provides kits for use in a clinical and/or research setting. An exemplary kit includes: (a) a first vial containing the enteric contrast medium of the invention; (b) a second vial containing an emulsifying agent; and (c) directions for using and/or formulating the enteric contrast medium as an emulsion. In various embodiments, the kit further comprises another vial containing a second contrast medium; and directions for administering and/or formulating the first and second enteric contrast medium in a clinical or research setting.

The contrast medium contained in the second vial can be soluble or insoluble in the pharmaceutically acceptable vehicle. When the second contrast medium is a particulate agent, the second contrast medium can include different atoms in the particulate core, a different coating, be of a different diameter, etc. relative to the first contrast medium. The second contrast medium can also be one or more of an iodinated, Ba-, Gd-, W-, Bi-, Si- or Ta-based contrast medium.

In various embodiments, the contrast medium includes an activated particle of a siloxane polymer. Activated particles useful in forming the coated contrast medium of the invention are discussed herein. The discussion focuses on preparing a particle which is activated and subsequently modified ("coated") with a modifying group (e.g., water-soluble polymer) for clarity of illustration. In particular, the discussion focuses on the preparation of modified sugars that include a poly(ethylene glycol) moiety. Those of skill will appreciate that the methods set forth herein are broadly applicable to the preparation of activated particles and their polymer conjugates, therefore, the discussion should not be interpreted as limiting the scope of the invention.

In general, the particle and the modifying group are linked together through the use of reactive groups, which are typically transformed by the linking process into a new organic functional group or unreactive species. Reactive groups and classes of reactions useful in practicing the present invention are generally those that are well known in the art of bioconjugate chemistry. Currently favored classes of reactions available to activate particles are those which proceed under relatively mild conditions. These include, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, Smith and March, ADVANCED ORGANIC CHEMISTRY, 5th Ed., John Wiley & Sons, New York, 2001; Hermanson, BIOCONJUGATE TECHNIQUES, Academic Press, San Diego, 1996; and Feeney et al., MODIFICATION OF PROTEINS; Advances in Chemistry Series, Vol. 198, American Chemical Society, Washington, D.C., 1982.

Useful reactive functional groups pendent from an activated particle or a modifying group include, but are not limited to:

(a) carboxyl groups and various derivatives thereof including, but not limited to, N-hydroxysuccinimide esters, N-hydroxybenzotriazole esters, acid halides, acyl imidazoles, thioesters, p-nitrophenyl esters, alkyl, alkenyl, alkynyl and aromatic esters;

(b) hydroxyl groups, which can be converted to, e.g., esters, ethers, aldehydes, etc.

(c) haloalkyl groups, wherein the halide can be later displaced with a nucleophilic group such as, for example, an amine, a carboxylate anion, thiol anion, carbanion, or an alkoxide ion, thereby resulting in the covalent attachment of a new group at the functional group of the halogen atom;

(d) dienophile groups, which are capable of participating in Diels-Alder reactions such as, for example, maleimido groups;

(e) aldehyde or ketone groups, such that subsequent derivatization is possible via formation of carbonyl derivatives such as, for example, imines, hydrazones, semicarbazones or oximes, or via such mechanisms as Grignard addition or alkyllithium addition;

(f) sulfonyl halide groups for subsequent reaction with amines, for example, to form sulfonamides;

(g) thiol groups, which can be, for example, converted to disulfides or reacted with alkyl and acyl halides;

(h) amino or sulfhydryl groups, which can be, for example, acylated, alkylated or oxidized;

(i) alkenes, which can undergo, for example, cycloadditions, acylation, Michael addition, etc; and (j) epoxides, which can react with, for example, amines and hydroxyl compounds.

The reactive functional groups can be protected from participating in the reaction by the presence of a protecting group. Those of skill in the art understand how to protect a particular functional group such that it does not interfere with a chosen set of reaction conditions. For examples of useful protecting groups, see, for example, Greene et al., PROTECTIVE GROUPS IN ORGANIC SYNTHESIS, John Wiley & Sons, New York, 1991.

Figure 9:
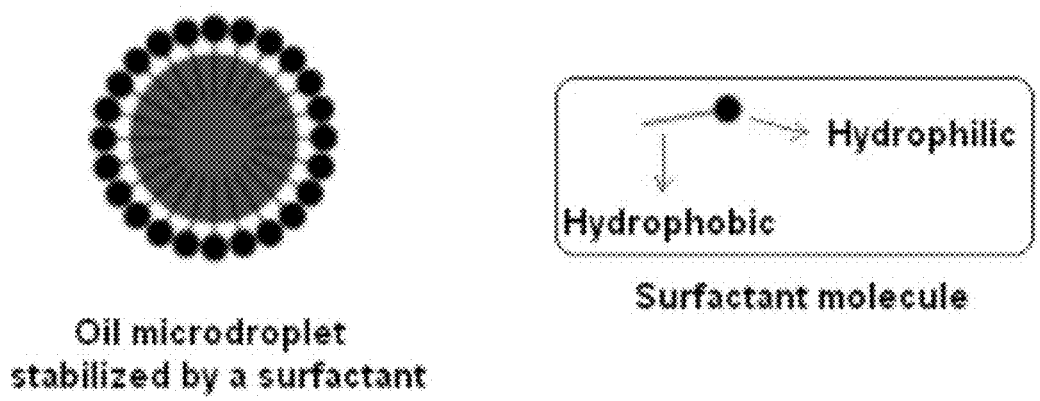
FIG. 9. Scheme for oil-in-water emulsion particles/droplets.

An exemplary route to modified and coated particles is shown in FIG. 9.

The use of reactive derivatives of poly(ethylene glycol) (PEG) (or other polymers or coatings) to attach one or more modifying group to the particle is within the scope of the present invention. The invention is not limited by the identity of the reactive poly(ethylene glycol) analogue. Many activated derivatives of poly(ethylene glycol) are available commercially and in the literature. It is well within the abilities of one of skill to choose, and synthesize if necessary, an appropriate activated PEG derivative with which to prepare a substrate useful in the present invention. See, Abuchowski et al. *Cancer Biochem. Biophys.*, 7: 175-186 (1984); Abuchowski et al., *J. Biol. Chem.*, 252: 3582-3586 (1977); Jackson et al., *Anal. Biochem.*, 165: 114-127 (1987); Koide et al., *Biochem Biophys. Res. Commun.*, 111: 659-667 (1983)), tresylate (Nilsson et al., *Methods Enzymol.*, 104: 56-69 (1984); Delgado et al., *Biotechnol. Appl. Biochem.*, 12: 119-128 (1990)); N-hydroxysuccinimide derived active esters (Buckmann et al., *Makromol. Chem.*, 182: 1379-1384 (1981); Joppich et al., *Makromol. Chem.*, 180: 1381-1384 (1979); Abuchowski et al., *Cancer Biochem. Biophys.*, 7: 175-186 (1984); Katreet al. *Proc. Natl. Acad. Sci. USA.*, 84: 1487-1491 (1987); Kitamura et al., *Cancer Res.*, 51: 4310-4315 (1991); Boccu et al., *Z. Naturforsch.*, 38C: 94-99 (1983), carbonates (Zalipsky et al., POLY(ETHYLENE GLYCOL) CHEMISTRY: BIOTECHNICAL AND BIOMEDICAL APPLICATIONS, Harris, Ed., Plenum Press, New York, 1992, pp. 347-370; Zalipsky et al., *Biotechnol. Appl. Biochem.*, 15: 100-114 (1992); Veronese et al., *Appl. Biochem. Biotech.*, 11: 141-152 (1985)), imidazolyl formates (Beauchamp et al., *Anal. Biochem.*, 131: 25-33 (1983); Berger et al., *Blood*, 71: 1641-1647 (1988)), 4-dithiopyridines (Woghiren et al., *Bioconjugate Chem.*, 4: 314-318 (1993)), isocyanates (Byun et al., *ASAIO Journal*, M649-M-653 (1992)) and epoxides (U.S. Pat. No. 4,806,595, issued to Noishiki et al., (1989). Other linking groups include the urethane linkage between amino groups and activated PEG. See, Veronese, et al., *Appl. Biochem. Biotechnol.*, 11: 141-152 (1985).

The particle coating of the invention may include one or more polymer. Polymeric drug delivery systems are known in the art. See, for example, Dunn et al., Eds. POLYMERIC DRUGS AND DRUG DELIVERY SYSTEMS, ACS Symposium Series Vol. 469, American Chemical Society, Washington, D.C. 1991. Those of skill in the art will appreciate that substantially any known water-insoluble polymer is applicable to contrast medium of the present invention.

Representative polymers include, but are not limited to, polyphosphazines, poly(vinyl alcohols), polyamides, polycarbonates, polyalkylenes, polyacrylamides, polyalkylene glycols, polyalkylene oxides, polyalkylene terephthalates, polyvinyl ethers, polyvinyl esters, polyvinyl halides, polyvinylpyrrolidone, polyglycolides, polysiloxanes, polyurethanes, poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate), poly(octadecyl acrylate) polyethylene, polypropylene, poly(ethylene glycol), poly(ethylene oxide), poly (ethylene terephthalate), poly(vinyl acetate), polyvinyl chloride, polystyrene, polyvinyl pyrrolidone, pluronics and polyvinylphenol and copolymers thereof.

Synthetically modified natural polymers of use in the contrast medium of the invention include, but are not limited to, alkyl celluloses, hydroxyalkyl celluloses, cellulose ethers, cellulose esters, and nitrocelluloses. Preferred members of the broad classes of synthetically modified natural polymers include, but are not limited to, methyl cellulose, ethyl cellulose, hydroxypropyl cellulose, hydroxypropyl methyl cellulose, hydroxybutyl methyl cellulose, cellulose acetate, cellulose propionate, cellulose acetate butyrate, cellulose acetate phthalate, carboxymethyl cellulose, cellulose triacetate, cellulose sulfate sodium salt, and polymers of acrylic and methacrylic esters and alginic acid.

These and the other polymers discussed herein can be readily obtained from commercial sources such as Sigma Chemical Co. (St. Louis, MO), Polysciences (Warrenton, PA), Aldrich (Milwaukee, WI), Fluka (Ronkonkoma, NY), and BioRad (Richmond, CA), or else synthesized from monomers obtained from these suppliers using standard techniques.

In various embodiments, the particle or droplet is coated with one or more biodegradable or bioresporbable polymer. Representative biodegradable polymers of use in the particles or droplets of the invention include, but are not limited to, polylactides, polyglycolides and copolymers thereof, poly(ethylene terephthalate), poly(butyric acid), poly(valeric acid), poly(lactide-co-caprolactone), poly(lactide-co-glycolide), polyanhydrides, polyorthoesters, blends and copolymers thereof.

For purposes of the present invention, the term "bioresorbable molecule" includes a region that is capable of being metabolized or broken down and resorbed and/or eliminated through normal excretory routes by the body. Such metabolites or break down products are preferably substantially non-toxic to the body.

The bioresorbable region may be either hydrophobic or hydrophilic, so long as the copolymer composition as a whole is not rendered water-soluble. Thus, the bioresorbable region is selected based on the preference that the polymer, as a whole, remains water-insoluble. Accordingly, the relative properties, i.e., the kinds of functional groups contained by, and the relative proportions of the bioresorbable region, and the hydrophilic region are selected to ensure that useful bioresorbable compositions remain water-insoluble.

Exemplary resorbable polymers include, for example, synthetically produced resorbable block copolymers of poly (α-hydroxy-carboxylic acid)/poly(oxyalkylene, (see, Cohn et al., U.S. Pat. No. 4,826,945). These copolymers are not crosslinked and are water-soluble so that the body can excrete the degraded block copolymer compositions. See, Younes et al., *J Biomed. Mater. Res.* 21: 1301-1316 (1987); and Cohn et al., *J Biomed. Mater. Res.* 22: 993-1009 (1988).

Presently preferred bioresorbable polymers include one or more components selected from poly(esters), poly(hydroxy acids), poly(lactones), poly(amides), poly(ester-amides), poly (amino acids), poly(anhydrides), poly(orthoesters), poly(carbonates), poly(phosphazines), poly(phosphoesters), poly(thioesters), polysaccharides and mixtures thereof. More preferably still, the biosresorbable polymer includes a poly(hydroxy) acid component. Of the poly(hydroxy) acids, polylactic acid, polyglycolic acid, polycaproic acid, polybutyric acid, polyvaleric acid and copolymers and mixtures thereof are preferred.

In various embodiments the enteric contrast medium formulation does not contain an amount of silicon-based polymer found in an oral care formulation and/or is not of use as an oral care formulation. In various embodiments, the enteric contrast medium formulation does not contain an amount of silicon-based polymer found in a formulation to prevent flatulence and/or is not of use as a formulation to prevent flatulence. In various embodiments, the formulation includes at least 10%, at least 30%, at least 50%, at least 70% or at least 100% more silicon-based polymer than would be included in formulations for oral care or prevention of flatulence. In various embodiments, the silicon-based polymer is not adsorbed onto a solid particle.

B. Methods

The invention also provides methods of utilizing the formulations of the invention to acquire and enhance clinically meaningful CT images from a subject to whom the formulation of the invention is administered. Thus, in an exemplary embodiment, the invention provides a method of acquiring contrast enhanced CT projection data of a subject which are then reconstructed into CT images. The method includes, administering to the subject a diagnostically effective amount of said enteric contrast medium formulation of the invention; and acquiring the CT projection data of the subject which are then reconstructed into CT images. In various embodiments, the enteric contrast medium has an 80:140 kVp CT number ratio of greater than 2.0 in said image in a DECT imaging experiment.

In an exemplary embodiment, the invention provides a contrast enhanced CT image of a subject through a region of the subject in which the contrast medium of the invention is distributed.

The image of the invention, and those acquired by the method of the invention utilize a contrast medium of the invention. The image is taken through any section of the body of the subject. In an exemplary method, the image is through the abdomen and/or pelvis of the subject.

The invention also provides methods for post-processing the CT projection data, the CT images, or both to digitally separate the CT signal produced by contrast medium of the invention from CT signal produced by soft tissue, bodily fluid, or another contrast medium. In various embodiments, two-material decomposition, three-material decomposition, multi-material decomposition, or virtual monochromatic images and a combination thereof is used to separate the CT signal produced by contrast material of the invention from CT signal produced by another contrast medium or bodily tissues. In an exemplary embodiment of the invention, material decomposition image post-processing produces new CT images where the CT signal from the contrast material of the invention is highlighted or subtracted from the CT signal produced by the other contrast material or bodily tissues. In an exemplary embodiment of the invention, material decomposition image post-processing produces new CT images where the CT signal from a contrast material other than the contrast of the invention is highlighted or subtracted from the CT signal produced by the contrast material of the invention or bodily tissues.

One of the advantages of the contrast media and formulations of the invention is compatibility with the administration of one or more additional contrast agents through any desired route. In various embodiments, the method further comprises administering to the subject a second contrast medium different from the enteric contrast medium. In various embodiments, the second contrast medium is administered through a route selected from intravascular administration, enteric administration, anal administration and administration into a different bodily cavity that is natural (e.g. vagina, bladder), caused by injury (e.g., fistula, abscess, sinus tract), surgically created (e.g. neobladder, ileal pouch), or artificial (e.g. medical device such as a catheter, reservoir, tube, or pump). A plurality of contrast materials may be administered to different bodily compartments. In an exemplary embodiment, the second contrast medium is an iodine- or barium-based medium, and a third contrast medium is a tantalum-, bismuth-, ytterbium-, gadolinium-, or tungsten-based contrast medium.

In an exemplary embodiment, the first and second contrast agents are distinguishable from each other in an image set encompassing a region in which both first and second contrast media are distributed. An exemplary second contrast medium is an iodinated contrast medium.

The second contrast medium can be soluble or insoluble in a pharmaceutically acceptable vehicle. When the second contrast medium is a particulate agent, the second contrast medium can include different atoms in the particulate core, a different coating, be of a different diameter, etc. relative to the first contrast agents. The second contrast medium can also be one or more of an iodinated, Ba-, Gd-, W-, Si-, Mg-, Yb-, Bi-, or Ta-based contrast medium.

In an exemplary embodiment, the second contrast medium is an iodine-based or barium-based medium.

In an exemplary embodiment, the second contrast medium is a silica-based medium.

The following Examples are offered to illustrate exemplary embodiments of the invention and do not define or limit its scope.

EXAMPLES

Example 1

(Method 1) One percent of surfactant Tween 20 (Sigma-Aldrich) aqueous solution was prepared by dissolving 50 mg of Tween-20 in 4.95 g of distilled water. To this clear solution (in a 50-ml centrifuge tube) was added dropwise 15.0 g of silicon-based polymer (50 cSt@ 25° C., Fisher Scientific) during moderate vortexing, through a 20-ml syringe attached with a 23 G needle. After completion of the addition, the mixture was vigorously vortexed at room temperature for 3 minutes, giving a 75 wt % oil-in-water (o/w) type emulsion with 0.25 wt % of Tween 20 surfactant (Note: tiny air bubbles are not avoidable in non-vacuum preparation conditions). This emulsion was measured to give the average particle size as 60 microns on a Malvern 3000 ZetaSizer. The emulsion can be stably stored at room temperature without phase separation for at least 3 months. CT scan proved its homogeneity (except the existence of tiny air bubbles).

(Method 2) One percent of surfactant Tween-20 (Sigma-Aldrich) aqueous solution was prepared by dissolving 50 mg of Tween 20 in 4.95 g of distilled water. To this clear solution (in a 50-ml round bottom flask) was added slowly 15.0 g of silicon-based polymer (50 cSt, Fisher Scientific) during vigorous stirring. After completion of the addition, the mixture was sonicated with probe sonicator/homogenizer for 5 minutes at room temperature, giving a 75 wt % oil-in-water (o/w) type emulsion.

Of note, the larger laboratory-scale preparation (1-2 liter size) of the same formulation can be facilely and quickly conducted by vigorously mixing the aqueous phase (the dilute Tween-20 aqueous solution) and the oil phase (silicone oil) with a fast-speed mechanical stirrer (for example up to 2000 cpm) within 5 to 30 min at room temperature.

Likewise, emulsions are prepared using silicon-based polymers with different viscosities (350 cSt and 1000 cSt from Sigma Aldrich, 100000 cSt from Dow Corning). The more viscous oils are added through bigger needles (e.g., 19 G needle) when Method 1 is chosen in the case of small-scale preparation.

Example 2

The procedure of Example 1 was followed using Triton X-100.

Example 3

The procedure of Example 1 was followed using Triton X-100 and a fluorinated silicon-based polymer FS-1265 (viscosity 350 cSt, Dow Corning).

Example 4

A range of silicon-based polymers were incorporated into CT phantoms and imaged. The silicon-based polymers showed very high and consistent 80:140 kVp CT number ratios and 100:140 kVp CT number ratios (FIG. 7).

Example 5

Figure 3:
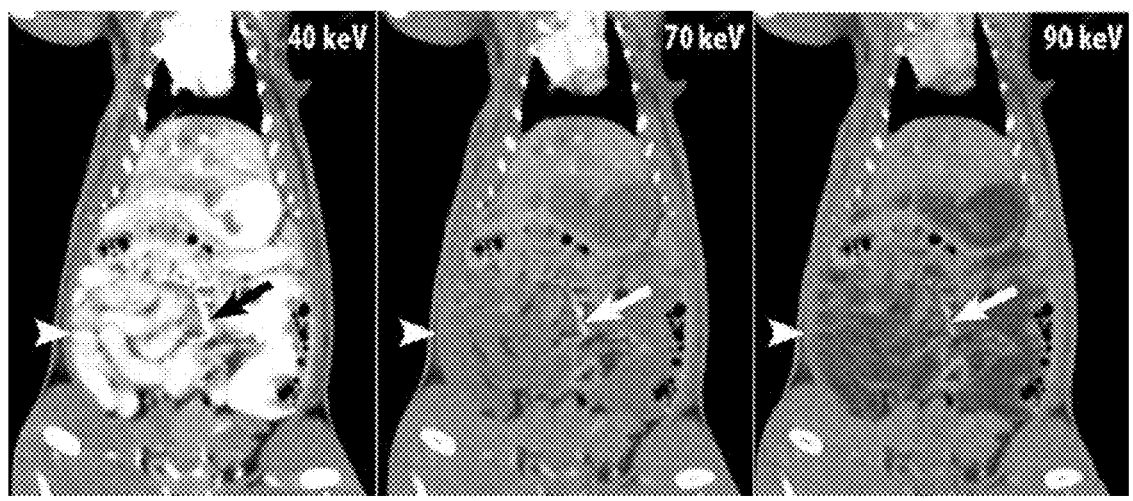
FIG. 3. Silicon-based polymer allows for simultaneous imaging with intravenous contrast material to provide simultaneous "positive", "neutral" and "negative" bowel contrast imaging of a subject in a single DECT scan at virtual monochromatic CT image reconstructions. Rat imaged with enteric silicon-based polymer and intravascular iohexol iodinated contrast material at dual energy CT, with image reconstruction as simple virtual monochromatic 40 keV (left), 70 keV (middle), and 90 keV (right) images. The intravascular contrast material loses some signal between the 40 and 90 keV images but is still visible as bright signal (arrows) even on the 90 keV image. The enteric silicon-based polymer contrast material (arrowheads) is markedly bright on 40 keV images, is neutral signal (similar to muscle and water) on the 70 keV image, and is negative signal (much darker than water) on the 90 keV image. The bowel wall enhancement by iodinated vascular contrast material remains clearly seen as bright signal on the 90 keV image. This vivid differentiation of the two contrast materials supports the combined use of two appropriately complementary contrast agents (for example, enteric silicon-based polymer and intravenous iodinated agent), and the use of different keV settings to differentiate between the two agents. Alternatively, more standard two-, three-, or multi-material decomposition methods can be used to differentiate the contrast materials (see FIG. 6).

In vivo imaging experiment in the rat demonstrated that a silicon-based polymer-based contrast agent of the invention provides simultaneous positive, neutral and negative bowel contrast in a single DECT scan. FIG. 3 shows the silicon-based polymer-based contrast agent of the invention as bright signal on 40 keV virtual monochromatic image (left image, arrowhead), neutral signal similar to water on 70 keV virtual monochromatic image (middle image, arrowhead), and negative signal similar to fat on a 90 keV virtual monochromatic image (right image, arrowhead). On all three images, the intravascular iodinated contrast material (arrow) remains bright in signal. These images were generated using CT scan projection data that was used for 2 material decomposition to reconstruct the virtual monochromatic 40, 70, and 90 keV CT images.

Figure 4:
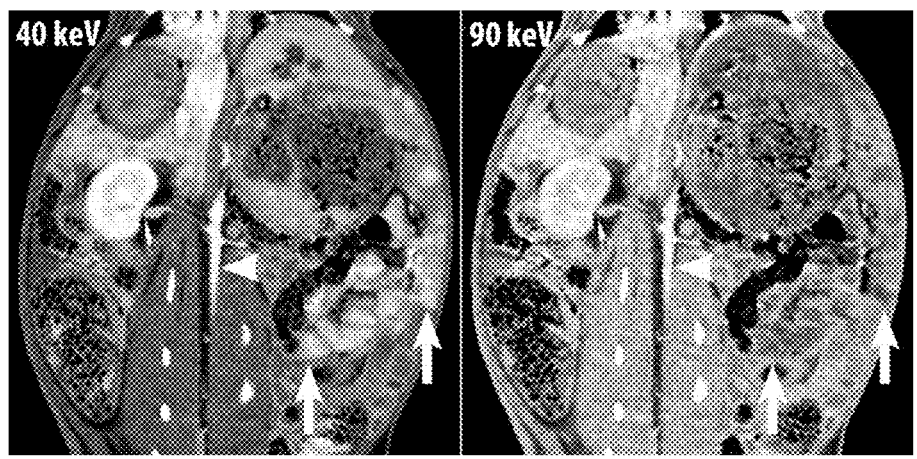
FIG. 4. Silicon-based polymer emulsion allows for simultaneous imaging with intravenous contrast material to provide simultaneous "positive" and "negative" bowel contrast imaging of bowel in a single DECT scan. Rabbit imaged with enteric silicon-based polymer emulsion and intravascular iohexol iodinated contrast material at dual energy CT, with image reconstruction as simple virtual monochromatic 40 keV (left) and 90 keV (right) images. The intravascular contrast material loses some signal between the 40 and 90 keV images but is still visible as bright signal (arrowheads) even on the 90 keV image. The enteric silicon-based polymer emulsion contrast material (arrows) is markedly bright on 40 keV images yet is negative signal (darker than water) on the 90 keV image. The bowel wall enhancement by vascular contrast material is clearly seen on the 90 keV image where the bowel lumen is dark. The ability to modulate the bowel lumen brightness is not possible with conventional CT or DECT scans imaged using conventional iodinated or barium enteric contrast materials and conventional iodinated intravascular contrast because barium and iodine cannot be differentiated at DECT or conventional CT.

In vivo imaging experiment in the rabbit demonstrated that a silicon-based polymer-based contrast agent of the invention provides simultaneous positive and neutral to negative bowel contrast in a single DECT scan. FIG. 4 shows the silicon-based polymer-based contrast agent of the invention as bright signal on 40 keV virtual monochromatic image (left image, arrow) and neutral to negative on 90 keV virtual monochromatic image (right image, arrow). On both images, the intravascular iodinated contrast material (arrowheads) remains bright in signal. These images were generated using CT scan projection data that was used for 2 material decomposition to reconstruct the virtual monochromatic 40 and 90 keV CT images.

Figure 5:
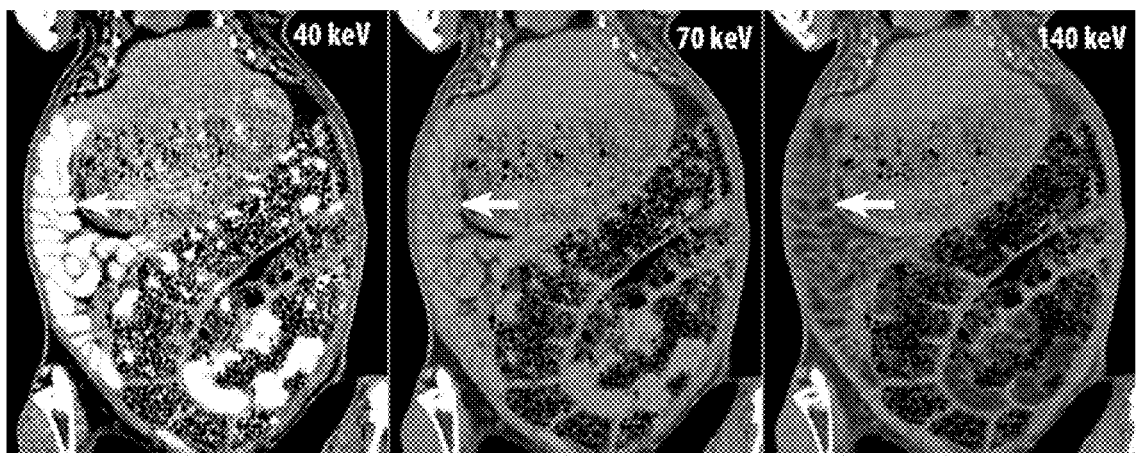
FIG. 5. In a non-intravascular contrast-enhanced CT, silicon-based polymer emulsion provides simultaneous "positive", "neutral" and "negative" bowel contrast imaging of bowel in a single DECT scan. No intravenous contrast was given in this exam. A rabbit imaged with enteric silicon-based polymer emulsion at dual energy CT, with image reconstruction as simple virtual monochromatic 40 keV (left) 70 keV (middle) and 140 keV (right) images. The enteric silicon-based polymer emulsion contrast material (arrows) can be chosen to be represented as bright positive signal (40 keV) image), neutral signal (70 keV), or very dark signal (140 keV) or any shade of gray in between as desired by the reader by dynamic adjustment of the keV setting. This ability to modulate the bowel lumen brightness is not possible with conventional CT or DECT scans imaged using conventional iodinated or barium enteric contrast materials which at best can only be shown to be positive or neutral in signal intensity relative to water and soft tissue.

In vivo imaging experiment in the rabbit demonstrated that a silicon-based polymer-based contrast agent of the invention provides simultaneous positive, neutral, and negative bowel contrast in a single DECT scan. FIG. 5 shows the silicon-based polymer-based contrast agent of the invention as bright signal on 40 keV virtual monochromatic image (left image, arrow), neutral signal similar to water on 70 keV virtual monochromatic image (middle image, arrow), and negative signal similar to fat on a 140 keV virtual monochromatic image (right image, arrow). The bowel wall does not change substantially in signal across these different virtual monochromatic images. These images were generated using CT scan projection data that was used for 2 material decomposition to reconstruct the virtual monochromatic 40, 70, and 140 keV CT images.

Figure 6:
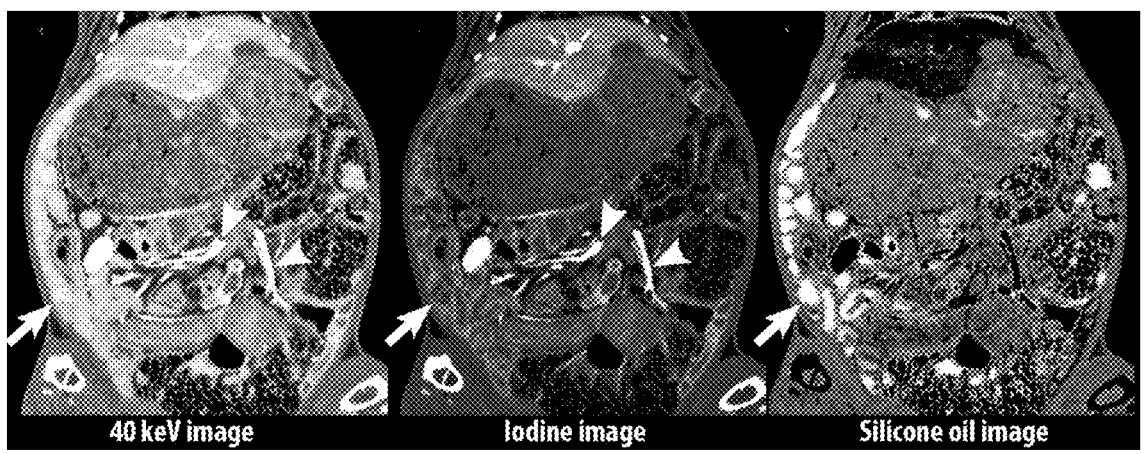
FIG. 6. Rabbit with silicon-based polymer enteric contrast material and intravascular iohexol imaged at dual energy CT, with digital three material decomposition to distinguish the silicon-based polymer and iohexol contrast material. The 40 keV virtual monochromatic image shows bowel wall indistinguishable from bowel lumen contrast (arrow, left image). The iodine map image (middle) shows clearly the bowel wall with digital removal of the silicon-based polymer contrast. Similarly, the silicon-based polymer map image (right) shows the bowel lumen clearly with digital removal of the iodinated contrast material (arrow). The blood vessels (arrowheads) are vividly depicted on the iodine map image (middle) where the enteric contrast was digitally subtracted by material decomposition and these blood vessels are more readily seen compared with the 40 keV image (left).

In vivo imaging experiment in the rabbit demonstrated that a silicon-based polymer-based contrast agent of the invention can be isolated from a second intravascular contrast material on a single DECT scan. FIG. 6 shows the silicon-based polymer-based contrast agent of the invention as bright signal within the bowel lumen on 40 keV virtual monochromatic image (left image, arrow) and the iodinated intravascular contrast agent as bright signal in the blood vessels (left image, arrowheads). 3 material decomposition images show the silicon-based contrast material after subtraction of the iodinated intravascular contrast material signal (right image), and the iodinated contrast material after subtraction of the silicon-based enteric contrast material (middle image). For this illustration, the soft tissue signal was added back to the iodine and the silicone oil images. The 3 material decomposition in this example was performed on 40 and 140 keV virtual monochromatic CT images rather than on the more well published method of using 80 and 140 kVp CT images for 3 material decomposition, and shows the versatility of the contrast material of the invention.

The present invention has been illustrated by reference to various exemplary embodiments and examples. As will be apparent to those of skill in the art other embodiments and variations of this invention may be devised by others skilled in the art without departing from the true spirit and scope of the invention. The appended claims are to be construed to include all such embodiments and equivalent variations.

The disclosures of each and every patent, patent application, and publication cited herein are hereby incorporated herein by reference in their entirety.

What is claimed is:

1. A method of acquiring contrast enhanced dual energy computed tomography or spectral computed tomography projection data of the abdomen of the subject, the pelvis of the subject, or a combination thereof in which an enteric contrast medium formulation is distributed, said method comprising:
   (a) formulating for administration to the subject a unit dosage of the enteric contrast medium formulation, the unit dosage containing an amount of the enteric contrast medium formulation diagnostically effective for the subject;
   (b) contemporaneous with acquiring the projection data, orally administering the unit dosage of the enteric contrast medium formulation of (a) to the subject,
   the enteric contrast medium formulation comprising:
      (i) an enteric contrast medium comprising an emulsion of about 50% (w/w) to about 90% (w/w) of a polysiloxane oil in a sterile water carrier, stabilized with an emulsifying or dispersing agent,
         wherein the polysiloxane oil has an 80:140 kVp of greater than 2.1,
         wherein the polysiloxane oil is not adsorbed onto a solid particle, and
         wherein the polysiloxane oil provides a difference in 80:140 kVp CT number ratios compared to soft tissue and water; and
   (c) acquiring the projection data of the abdominal region of the subject in which the enteric contrast medium formulation is distributed.

2. The method according to claim 1, wherein the enteric contrast medium formulation is a unit dosage formulation comprising a diagnostically effective amount of said enteric contrast medium.

3. The method according to claim 2, wherein the enteric contrast medium formulation is a unit dosage formulation of from about 800 mL to about 1200 mL per adult human dose.

4. The method according to claim 2, wherein the enteric contrast medium formulation a unit dosage formulation of from about 50 to about 100 mL in volume.

5. The method according to claim 2, wherein the enteric contrast medium formulation is a unit dosage formulation of from about 100 mL to about 800 mL in volume.

6. The method according to claim 1, wherein said polysiloxane oil is liquid at room or body temperature.

7. The method according to claim 1, wherein the enteric contrast medium formulation is a unit dosage formulation and it contains more than about 25 g of said polysiloxane oil.

8. The method according to claim 1, wherein the emulsifier comprises a water-soluble polymer.

9. The method according to claim 8, wherein said emulsifier comprises one or more poly (ethylene glycol) chains.

10. The method according to claim 1, wherein said formulation further comprises an additive to retard dehydration of said formulation in the bowel, a flavoring agent, a sweetener, a thickening agent, a suspending agent, a flow agent, a pH buffer, a laxative, an osmolality-adjusting agent, and a combination thereof.

11. The method according to claim 1, wherein said dual energy computed tomography or spectral computed tomography projection data is reconstructed into a computed tomography image displaying the enteric contrast medium distributed to the abdomen of the subject, the pelvis of the subject, or the combination thereof.

12. The method of claim 1, wherein said contrast agent is imaged using a dual energy or spectral computed tomography (CT) scanner with X-ray filters of different material or thickness (including zero) that modify the energy spectra of the X-ray beams.

13. The method according to claim 1, wherein said X-ray or computed tomography or dual energy computed tomography or spectral computed tomography projection data are used for 2-material, 3-material, or multi-material decomposition and reconstructed into CT images.

14. The method according to claim 11, wherein said computed tomography images are used for 2-material, 3-material, or multi-material decomposition to reconstruct additional CT images.

15. The method according to claim 11, wherein said computed tomography image is used diagnostically to distinguish said enteric contrast medium formulation from other materials in the abdomen.

16. The method according to claim 1, wherein the method further comprises administering to the subject a second contrast medium different from the enteric contrast medium, and the second contrast medium is administered through a route selected from oral administration, intrathecal administration, intravesicular administration, enteric administration, anal administration, intracatheter administration, intradevice administration, intravascular administration, administration into a fistula, and administration into a surgically created pouch.

17. The method according to claim 16, wherein said second contrast medium is a member selected from an iodinated contrast medium, a Ba-, Gd- W-, Bi-, Mg-, Yb- and a Ta-based contrast medium and a silicon based contrast medium.

18. The method according to claim 16, wherein said enteric contrast medium and said second contrast medium are distinguishable from each other in said image based on their relative X-ray attenuation at different X-ray spectra.

19. The method according to claim 1, wherein the enteric contrast agent formulation is prepared prior to the administration of the formulation to the subject from a kit comprising:
(a) a first vial or set of vials containing the enteric contrast medium;
(b) a second vial containing a second contrast medium; and
(c) directions for preparing the enteric contrast medium formulation with or without the second contrast medium.

20. The method of claim 11, further comprising using the computed tomography image in diagnosing a condition of the subject, which is a member selected from injury, malignancy, inflammation, infection, and ischemia, and a combination thereof.

21. The method of claim 11, wherein the computed tomography image is used to evaluate anatomical detail of the subject involving bowel or tissues adjacent to the bowel.

22. A method of acquiring contrast enhanced dual energy computed tomography or spectral computed tomography projection data of the abdomen of the subject, the pelvis of the subject, or a combination thereof, said method comprising:
(a) orally administering to the subject a diagnostically effective amount of the enteric contrast medium formulation which is formulated for oral delivery to the subject contemporaneously with a medical imaging procedure performed on the abdomen of said subject, said formulation comprising:
(i) an enteric contrast medium comprising an emulsion of about 50% (w/w) to about 90% (w/w) of a polysiloxane oil in a sterile water carrier, stabilized with an emulsifying or dispersing agent wherein the polysiloxane oil has an 80:140 kVp of greater than 2.1,
wherein the polysiloxane oil is not adsorbed onto a solid particle, and
wherein the polysiloxane oil provides a difference in 80:140 kVp CT number ratios compared to iodinated or barium contrast material or compared to soft tissue and water; and
(b) acquiring the projection data of the abdominal region of the subject.

23. A method of acquiring contrast enhanced dual energy computed tomography or spectral computed tomography projection data of the abdomen of a subject, the pelvis of a subject, or a combination thereof, said method comprising:
(a) orally administering to said subject a diagnostically effective amount of an enteric contrast medium formulation which is formulated for oral delivery to said subject contemporaneously with a medical imaging procedure performed on the abdomen of said subject, said formulation comprising:
(i) an enteric contrast medium comprising an emulsion of about 50% (w/w) to about 90% (w/w) of a polysiloxane oil in a sterile water carrier, stabilized with an emulsifying or dispersing agent, which is a water-soluble polymer, wherein the polysiloxane oil has an 80:140 kVp of greater than 2.1,
wherein the polysiloxane oil is not adsorbed onto a solid particle, and wherein the polysiloxane oil provides a difference in 80:140 kVp CT number ratios compared to iodinated or barium contrast material or soft tissue and water;

(b) acquiring the projection data of the abdominal region of the subject; and (c) manipulating the acquired projection data such that the enteric contrast medium formulation can alternatively provide "positive," "neutral," and "negative" contrast in the abdominal region of the subject and can be separated at dual energy computed tomography from iodinated or barium contrast material and from soft tissue or water.

24. The method of claim 23, further comprising using the computed tomography image in diagnosing a condition of the subject, which is a member selected from injury, malignancy, inflammation, infection, and ischemia, and a combination thereof.

25. The method according to claim 23, wherein the method further comprises administering to the subject a second contrast medium different from the enteric contrast medium, and the second contrast medium is administered through a route selected from oral administration, intrathecal administration, intravesicular administration, enteric administration, anal administration, intracatheter administration, intra-device administration, intravascular administration, administration into a fistula, and administration into a surgically created pouch.

26. The method according to claim 25, wherein said second contrast medium is a member selected from an iodinated contrast medium, a Ba-, Gd- W-, Bi-, Mg-, Yb- and a Ta-based contrast medium and a silicon based contrast medium.

27. The method according to claim 25, wherein said enteric contrast medium and said second contrast medium are distinguishable from each other in said image based on their relative X-ray attenuation at different X-ray spectra.

28. The method of any one of claims 1, 22, and 23, wherein said polysiloxane oil is a polydimethylsiloxane (PDMS).

* * * * *